United States Patent
Ishizeki et al.

(10) Patent No.: US 10,988,575 B2
(45) Date of Patent: *Apr. 27, 2021

(54) FLUOROETHER COMPOSITION, COATING FLUID AND ARTICLE

(71) Applicant: AGC Inc., Chiyoda-ku (JP)

(72) Inventors: Kenji Ishizeki, Chiyoda-ku (JP); Lilin Zhou, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/381,461

(22) Filed: Apr. 11, 2019

(65) Prior Publication Data

US 2019/0233587 A1     Aug. 1, 2019

Related U.S. Application Data

(63) Continuation of application No. PCT/JP2017/009811, filed on Mar. 10, 2017.

(30) Foreign Application Priority Data

Oct. 31, 2016 (JP) .............................. JP2016-213224

(51) Int. Cl.
| | |
|---|---|
| *C08G 65/00* | (2006.01) |
| *C08G 77/46* | (2006.01) |
| *C08K 5/5419* | (2006.01) |
| *C09D 4/00* | (2006.01) |
| *C08G 77/24* | (2006.01) |
| *C08G 65/336* | (2006.01) |
| *C09K 3/18* | (2006.01) |

(52) U.S. Cl.
CPC ......... *C08G 65/007* (2013.01); *C08G 65/336* (2013.01); *C08G 77/24* (2013.01); *C08G 77/46* (2013.01); *C08K 5/5419* (2013.01); *C09D 4/00* (2013.01); *C09K 3/18* (2013.01); *C08G 2650/48* (2013.01)

(58) Field of Classification Search
CPC .... C08G 65/336; C08G 65/007; C08G 77/46; C08G 77/24; C08G 2650/48; C08L 71/00; C09D 4/00; C09D 171/00; C08K 5/5419; C09K 3/18
See application file for complete search history.

(56) References Cited

U.S. PATENT DOCUMENTS

| | | | |
|---|---|---|---|
| 9,771,384 B2 | 9/2017 | Yamane et al. | |
| 10,450,413 B2 | 10/2019 | Mitsuhashi et al. | |
| 2011/0124532 A1* | 5/2011 | Maurer | C07F 7/1804 507/205 |
| 2013/0229378 A1* | 9/2013 | Iyer | C09D 4/00 345/173 |
| 2015/0274889 A1* | 10/2015 | Sakoh | C09D 171/00 428/410 |
| 2015/0307719 A1* | 10/2015 | Mitsuhashi | C09D 171/02 428/447 |
| 2016/0040039 A1 | 2/2016 | Yamane et al. | |
| 2016/0304665 A1* | 10/2016 | Sakoh | C09D 5/00 |
| 2019/0002635 A1 | 1/2019 | Mitsuhashi et al. | |
| 2019/0390009 A1 | 12/2019 | Mitsuhashi et al. | |

FOREIGN PATENT DOCUMENTS

| | | |
|---|---|---|
| JP | 2014-218639 | 11/2014 |
| JP | 2015-199906 | 11/2015 |
| JP | 6451279 B2 | 1/2019 |
| WO | WO 2012/064649 A1 | 5/2012 |
| WO | WO 2013/042732 A1 | 3/2013 |
| WO | WO 2013/115191 A1 | 8/2013 |
| WO | WO 2017/038830 A1 | 3/2017 |
| WO | WO 2017/038832 A1 | 3/2017 |

OTHER PUBLICATIONS

International Search Report dated May 9, 2017 in PCT/JP2017/009811 filed Mar. 10, 2017 (with English Translation).

* cited by examiner

*Primary Examiner* — Shane Fang
(74) *Attorney, Agent, or Firm* — Element IP, PLC

(57) ABSTRACT

To provide a fluoroether composition and a coating fluid that are able to form a surface layer having water/oil repellency, fingerprint stain removability and lubricity, and being excellent in abrasion resistance and light resistance, and an article having such a surface layer. A fluoroether composition, comprising: a specific compound (1) having a hydrolyzable silyl group at one terminal of a poly(oxyperfluoroalkylene) chain and a specific compound (2) having a plurality of hydrolyzable silyl groups at one terminal of a poly(oxyperfluoroalkylene) chain, wherein, in the fluoroether composition, the content of the compound (1) is from 10 to 90 mol %, to the total content of the compound (1) and the compound (2).

20 Claims, No Drawings

FLUOROETHER COMPOSITION, COATING FLUID AND ARTICLE

FIELD OF INVENTION

The present invention relates to a fluoroether composition, a coating fluid and an article.

BACKGROUND OF INVENTION

Fluorinated compounds show high lubricity, water/oil repellency, etc. and are thus useful for e.g. a surface treatment agent. For example, when a surface of a substrate is coated with a surface treatment agent so as to form a surface layer, e.g. lubricity and water/oil repellency are imparted to the surface of the substrate, whereby it becomes easier to wipe off stain on the surface of the substrate, and therefore stain removability will be improved. Among the fluorinated compounds, a fluoroether compound having a poly(oxyperfluoroalkylene) chain in which an ether bond (—O—) is present in the middle of a perfluoroalkyl chain, is excellent in fat and oil stain removability.

A surface treatment agent containing the fluoroether compound is useful in applications for which a performance of readily removing a fingerprint adhered to the surface by wiping (fingerprint stain removability) is required, such as a surface treatment agent for a member constituting a surface to be touched with a finger, of a touch panel.

Further, the surface layer formed on the surface of a substrate is required to have a performance that water/oil repellency is less likely to be lowered even if rubbed repeatedly with a finger (abrasion resistance). A touch panel (such as a digital signage for vending machines, guide plates, etc.) for outdoor use, a touch panel mounted on a vehicle, or the like, is required to have such a performance that water/oil repellency is less likely to be lowered even the panel is exposed to light for a long period of time (light resistance).

In order to impart abrasion resistance to the surface layer formed on the surface of a substrate, a hydrolyzable silyl group is introduced to a terminal of the fluoroether compound. The fluoroether compound having a hydrolyzable silyl group can be bonded to the surface of a substrate by a silanol group formed by decomposition of the hydrolyzable silyl group.

However, a fluoroether compound having one hydrolyzable silyl group at one terminal is bonded to the surface of the substrate only at one site, and therefore the abrasion resistance of the surface layer to be formed may be insufficient.

As a fluoroether compound or composition capable of forming a surface layer excellent in abrasion resistance, for example, the following are proposed.

A perfluoropolyether group-containing silane compound having three hydrolyzable silyl groups via a branch of Si at one terminal (Patent Document 1)

A composition containing a fluorinated organosilane compound having one hydrolyzable silyl group at one terminal and a fluorinated organosilane compound having hydrolyzable silyl groups at both terminals (Patent Document 2)

PRIOR ART DOCUMENTS

Patent Documents

Patent Document 1: JP-A-2014-218639
Patent Document 2: WO2012/064649

SUMMARY OF INVENTION

Technical Problem

According to findings by the present inventors, the surface layer formed from the compound of Patent Document 1 and the surface layer formed from the composition of Patent Document 2 are insufficient in light resistance, for the following reasons.

In a case where a fluoroether compound having a plurality of hydrolyzable silyl groups at one terminal or a fluoroether compound having hydrolyzable silyl groups at both terminals is used, a large space for bonding to the substrate is needed, and therefore the number of poly(oxyperfluoroalkylene) chains per unit surface area of the substrate becomes smaller. When the surface layer is exposed to sunlight or the like, the fluoroether compound decomposes, and the poly(oxyperfluoroalkylene) chain is released.

If the number of poly(oxyperfluoroalkylene) chains per unit surface area is small, even though a small number of poly(oxyperfluoroalkylene) chain is released, the water/oil repellency of the surface layer is lowered, that is, the light resistance is insufficient.

An object of the present invention is to provide a fluoroether composition and a coating fluid that are able to form a surface layer having water/oil repellency, fingerprint stain removability and lubricity, and being excellent in abrasion resistance and light resistance, and an article having a surface layer having water/oil repellency, fingerprint stain removability and lubricity, and being excellent in abrasion resistance and light resistance.

Solution to Problem

The present invention provides a fluoroether composition, a coating fluid and an article having the following constructions [1] to [12].

[1] A fluoroether composition comprising: a compound (1) represented by the following formula (1) and a compound (2) represented by the following formula (2), wherein the content of the compound (1) is from 10 to 90 mol %, to the total content of the compound (1) and the compound (2):

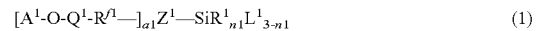  (1)

wherein
$A^1$ is a perfluoroalkyl group,
$Q^1$ is a single bond, an oxyfluoroalkylene group containing one or more hydrogen atoms (provided that the oxygen atom is bonded to $R^{f1}$), or a poly(oxyfluoroalkylene) chain containing one or more hydrogen atoms (provided that the terminal oxygen atom is bonded to $R^{f1}$ and the oxyfluoroalkylene group bonded to $R^{f1}$ contains one or more hydrogen atoms),
$R^{f1}$ is a poly(oxyperfluoroalkylene) chain (provided that the terminal oxygen atom is bonded to $Z^1$),
a1 is an integer of at least 1,
provided that, when a1 is at least 2, a1 pieces of [$A^1$-O-$Q^1$-$R^{f1}$—] may be the same or different from one another,
$Z^1$ is a (a1+1) valent connecting group,
$R^1$ is a hydrogen atom or a monovalent hydrocarbon group,
$L^1$ is a hydroxy group or a hydrolyzable group,
n1 is 0 or 1, and
(3−n1) pieces of $L^1$ may be the same or different;

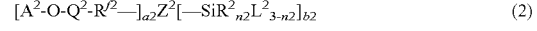  (2)

wherein

A² is a perfluoroalkyl group,

Q² is a single bond, an oxyfluoroalkylene group containing one or more hydrogen atoms (provided that the oxygen atom is bonded to $R^{f2}$), or a poly(oxyfluoroalkylene) chain containing one or more hydrogen atoms (provided that the terminal oxygen atom is bonded to $R^{f2}$ and the oxyfluoroalkylene group bonded to $R^{f2}$ contains one or more hydrogen atoms), $R^{f2}$ is a poly(oxyperfluoroalkylene) chain (provided that the terminal oxygen atom is bonded to $Z^2$), a2 is an integer of at least 1, provided that, when a2 is at least 2, a2 pieces of [$A^2$-O-$Q^2$-$R^{f2}$—] may be the same or different from one another, $Z^2$ is a (a2+b2) valent connecting group, $R^2$ is a hydrogen atom or a monovalent hydrocarbon group, $L^2$ is a hydroxy group or a hydrolyzable group, n2 is an integer of from 0 to 2, provided that when n2 is 0 or 1, (3−n2) pieces of $L^2$ may be the same or different, when n2 is 2, n2 pieces of $R^2$ may be the same or different, b2 is an integer of at least 2, and b2 pieces of [—$SiR^2_{n2}L^2_{3-n2}$] may be the same or different from one another.

[2] The fluoroether composition according to the above [1], wherein b2 is an integer of from 2 to 4.

[3] The fluoroether composition according to the above [1] or [2], wherein the compound (1) is a compound represented by the following formula (1-1), a compound represented by the following formula (1-2), a compound represented by the following formula (1-3), a compound represented by the following formula (1-4) or a compound represented by the following formula (1-5):

$A^1\text{-O-}Q^1\text{-}R^{f1}\text{-}Q^{11}CX_2O(CH_2)_3\text{—}SiR^1_{n1}L^1_{3-n1}$ (1-1)

$A^1\text{-O-}Q^1\text{-}R^{f1}\text{-}Q^{11}CX_2OCH_2CH(CH_3)\text{—}SiR^1_{n1}L^1_{3-n1}$ (1-2)

$A^1\text{-O-}Q^1\text{-}R^{f1}\text{-}Q^{11}C(O)NHC_kH_{2k}\text{—}SiR^1_{n1}L^1_{3-n1}$ (1-3)

$A^1\text{-O-}Q^1\text{-}R^{f1}\text{-}Q^{11}(CH_2)_2\text{—}SiR^1_{n1}L^1_{3-n1}$ (1-4)

$A^1\text{-O-}Q^1\text{-}R^{f1}\text{-}Q^{11}(CH_2)_3\text{—}SiR^1_{n1}L^1_{3-n1}$ (1-5)

wherein $A^1$, $Q^1$, $R^{f1}$, $R^1$, $L^1$ and n1 are the same as in the formula (1), $Q^{11}$ is a perfluoroalkylene group, $CX_2$ is CFH or $CH_2$, and k is an integer of at least 1.

[4] The fluoroether composition according to any one of the above [1] to [3], wherein the compound (2) is a compound represented by the following formula (2-1) or a compound represented by the following formula (2-2):

$A^2\text{-O-}Q^2\text{-}R^{f2}\text{-}Q^{21}\text{-}[C(O)N(R^{21})]_p\text{—}R^{22}\text{—}C[\text{—}R^{23}\text{—}SiR^2_{n2}L^2_{3-n2}]_3$ (2-1)

wherein $A^2$, $Q^2$, $R^{f2}$, $R^2$, $L^2$ and n2 are the same as in the formula (2), $Q^{21}$ is a perfluoroalkylene group, a fluoroalkylene group containing one or more hydrogen atoms, or a fluoroalkylene group with at least two carbon atoms, containing one or more hydrogen atoms and having an etheric oxygen atom between carbon atoms, $R^{21}$ is a hydrogen atom or an alkyl group, $R^{22}$ is a single bond, an alkylene group, an alkylene group having an etheric oxygen atom at a terminal (which is a terminal on the side bonded to C on the immediate right), an alkylene group with at least two carbon atoms, having an etheric oxygen atom between carbon atoms, or an alkylene group with at least two carbon atoms, having an etheric oxygen atom at a terminal (which is a terminal on the side bonded to C on the immediate right) and between carbon atoms, $R^{23}$ is an alkylene group, an alkylene group having an etheric oxygen atom at a terminal (which is a terminal on the side bonded to C on the immediate left), an alkylene group with at least two carbon atoms, having an etheric oxygen atom between carbon atoms, or an alkylene group with at least two carbon atoms, having an etheric oxygen atom at a terminal (which is a terminal on the side bonded to C on the immediate left) and between carbon atoms, $A^2\text{-O-}Q^2\text{-}R^{f2}\text{-}Q^{22}\text{-}R^{24}\text{—}N[\text{—}R^{25}\text{—}SiR^2_{n2}L^2_{3-n2}]_2$ (2-2)

wherein $A^2$, $Q^2$, $R^{f2}$, $R^2$, $L^2$ and n2 are the same as in the formula (2), $Q^{22}$ is a perfluoroalkylene group, $R^{24}$ is a single bond, an alkylene group, an alkylene group having an etheric oxygen atom or —NH— at a terminal (provided that a terminal on the side bonded to N is excluded), an alkylene group with at least two carbon atoms, having an etheric oxygen atom or —NH— between carbon atoms, or an alkylene group with at least two carbon atoms, having an etheric oxygen atom or —NH— at a terminal (provided that a terminal on the side bonded to N is excluded) and between carbon atoms, $R^{25}$ is an alkylene group, or an alkylene group with at least two carbon atoms, having an etheric oxygen atom or —NH— between carbon atoms.

[5] The fluoroether composition according to any one of the above [1] to [4], wherein the compound (1) has a number average molecular weight of from 500 to 20,000, and the compound (2) has a number average molecular weight of from 500 to 20,000.

[6] The fluoroether composition according to any one of the above [1] to [5], wherein the absolute value of the difference between the number average molecular weight of the compound (1) and the number average molecular weight of the compound (2) is at most 2,000.

[7] The fluoroether composition according to any one of the above [1] to [6], wherein $R^{f1}$ is $(R^{F1}O)_{m1}$ (in which $R^{F1}$ is a $C_{1-6}$ perfluoroalkylene group, m1 is an integer of from 2 to 200, and which may be composed of at least two types of $R^{F1}O$ having different number of carbon atoms) and $R^{f2}$ is $(R^{F2}O)_{m2}$ (in which $R^{F2}$ is a $C_{1-6}$ perfluoroalkylene group, m2 is an integer of from 2 to 200, and which may be composed of at least two types of $R^{F2}O$ having different number of carbon atoms).

[8] The fluoroether composition according to any one of the above [1] to [7], wherein $R^{f1}$ is $\{(CF_2O)_{m11}(CF_2CF_2O)_{m12}(CF_2CF_2CF_2O)_{m13}(CF_2CF_2CF_2CF_2O)_{m14}\}$ (in which each of m11 and m12 is an integer of at least 1, each of m13 and m14 is an integer of 0 or at least 1, and m11+m12+m13+m14 is an integer of from 2 to 200) or $(CF_2CF_2O\text{—}CF_2CF_2CF_2O)_{m15}(CF_2CF_2O)$ (in which m15 is an integer of from 1 to 100), and $R^{f2}$ is $\{(CF_2O)_{m21}(CF_2CF_2O)_{m22}(CF_2CF_2CF_2O)_{m23}(CF_2CF_2CF_2CF_2O)_{m24}\}$ (in which each of m21 and m22 is an integer of at least 1, each of m23 and m24 is an integer of 0 or at least 1, and m21+m22+m23+m24 is an integer of from 2 to 200) or $(CF_2CF_2O\text{—}CF_2CF_2CF_2O)_{m25}(CF_2CF_2O)$ (in which m25 is an integer of from 1 to 99).

[9] A coating fluid comprising: the fluoroether composition as defined in any one of the above [1] to [8]; and a liquid medium.
[10] An article having a surface layer which is formed of the fluoroether composition as defined in any one of the above [1] to [8].
[11] A method for producing an article, comprising: treating a surface of a substrate by dry coating using the fluoroether composition as defined in any one of the above [1] to [8], to produce an article having a surface layer which is formed of the fluoroether composition.
[12] A method for producing an article, comprising: treating a surface of a substrate by wet coating using the coating fluid as defined in the above [9], to produce an article having a surface layer which is formed of a fluoroether compound.

Advantageous Effects of Invention

According to the fluoroether composition and the coating fluid of the present invention, it is possible to form a surface layer having water/oil repellency, fingerprint stain removability and lubricity, and being excellent in abrasion resistance and light resistance.

The article of the present invention has a surface layer having water/oil repellency, fingerprint stain removability and lubricity, and being excellent in abrasion resistance and light resistance.

DETAILED DESCRIPTION OF INVENTION

In this specification, a compound represented by the formula (1) will be referred to as a compound (1). The same applies to compounds represented by other formulae.

Meanings of the following terms in this specification are as follows.

The chemical formula of an oxyfluoroalkylene group shall be written by placing its oxygen atom on the right side of the fluoroalkylene group.

An "etheric oxygen atom" means an oxygen atom to form an ether bond (—O—) between carbon atoms.

A "hydrolyzable silyl group" means a group capable of forming a silanol group (Si—OH) by hydrolysis. For example, it is $SiR^1_{n1}L^1_{3-n1}$ in the formula (1).

A "surface layer" means a layer formed on the surface of a substrate.

The "number average molecular weight" of a fluoroether compound is calculated by the following method using a NMR analysis.

The number average molecular weight is calculated by obtaining the number (mean value) of oxyperfluoroalkylene groups based on terminal groups, by $^1$H-NMR and $^{19}$F-NMR. The terminal groups may, for example, be $A^1$ or $SiR^1_{n1}L^1_{3-n1}$ in the formula (1).

[Fluoroether Composition]

The fluoroether composition of the present invention (hereinafter referred to also as the present composition) contains the specific compound (1) and the specific compound (2).

(Compound (1))

The compound (1) is a compound represented by the following formula (1):

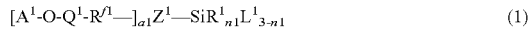
(1)

The compound (1) has $CF_3$— in $A^1$ at the terminal, whereby a surface layer with a low surface energy can be formed. Such a surface layer is excellent in lubricity and abrasion resistance. Further, the compound (1) has a poly(oxyperfluoroalkylene) chain as $R^{f1}$, whereby the content of the fluorine atoms is high. Therefore, a surface layer excellent in water/oil repellency, abrasion resistance and fingerprint stain removability can be formed.

$A^1$ is preferably a $C_{1-10}$ perfluoroalkyl group, more preferably a $C_{1-6}$ perfluoroalkyl group, particularly preferably a $C_{1-3}$ perfluoroalkyl group, from the viewpoint of further excellent lubricity and abrasion resistance of the surface layer.

In a case where $Q^1$ is an oxyfluoroalkylene group containing one or more hydrogen atoms (provided that the oxygen atom is bonded to $R^{f1}$) or a poly(oxyfluoroalkylene) chain containing one or more hydrogen atoms (provided that the terminal oxygen atom is bonded to $R^{f1}$ and the oxyfluoroalkylene group bonded to $R^{f1}$ contains one or more hydrogen atoms), the number of hydrogen atoms in $Q^1$ is at least one, preferably at least two, particularly preferably at least three, from the viewpoint of excellent outer appearance of the surface layer. The number of hydrogen atoms in $Q^1$ is preferably at most (the number of carbon atoms in $Q^1$)×2, particularly preferably at most (the number of carbon atoms in $Q^1$), from the viewpoint of further excellent water/oil repellency of the surface layer. By $Q^1$ having a hydrogen atom, the compound (1) has high solubility in a liquid medium. Accordingly, the compound (1) is less likely to be agglomerated in a coating fluid, and further, the compound (1) is less likely to be agglomerated during drying after applied on the surface of a substrate, whereby the surface layer is further excellent in outer appearance.

$Q^1$ is preferably a single bond, or a group selected from the group consisting of —CHFCF$_2$OCH$_2$CF$_2$O—, —CF$_2$CHFCF$_2$OCH$_2$CF$_2$CF$_2$O—, —CF$_2$CF$_2$CHFCF$_2$OCH$_2$CF$_2$O—, —CF$_2$CF$_2$OCHFCF$_2$OCH$_2$CF$_2$O—, —CF$_2$CF$_2$OCF$_2$CF$_2$OCHFCF$_2$OCH$_2$CF$_2$O—, —CF$_2$CH$_2$OCH$_2$CF$_2$O— and —CF$_2$CF$_2$OCF$_2$CH$_2$OCH$_2$CF$_2$O— (provided that the left side of $Q^1$ is bonded to $A^1$-O). $Q^1$ is particularly preferably a single bond or —CHFCF$_2$OCH$_2$CF$_2$O—.

$R^{f1}$ is preferably $(R^{F1}O)_{m1}$ (in which $R^{F1}$ is a $C_{1-6}$ perfluoroalkylene group, m1 is an integer of from 2 to 200, and which may be composed of at least two types of $R^{F1}O$ having different number of carbon atoms) from the viewpoint of further excellent abrasion resistance and fingerprint stain removability of the surface layer.

$R^{F1}$ is preferably a $C_{1-6}$ perfluoroalkylene group having no branched structure, more preferably a $C_{1-4}$ fluoroalkylene group having no branched structure, from the viewpoint of further excellent abrasion resistance and fingerprint stain removability of the surface layer, particularly preferably a $C_{1-2}$ fluoroalkylene group having no branched structure, from the viewpoint of further excellent lubricity of the surface layer.

m1 is an integer of from 2 to 200, preferably an integer of from 5 to 150, particularly preferably an integer of from 10 to 100. When m1 is at least the lower limit value of the above range, the surface layer is excellent in water/oil repellency.

When m1 is at most the upper limit value of the above range, the surface layer is excellent in abrasion resistance. That is, if a number average molecular weight of the compound (1) is too large, the number of hydrolyzable silyl groups present per unit molecular weight decreases, whereby the abrasion resistance deteriorates.

In $(R^{F1}O)_{m1}$, in a case where at least two types of $R^{F1}O$ having different number of carbon atoms are present, the bonding order of such plural types of $R^{F1}O$ is not limited.

For example, in a case where two types of $R^{F1}O$ are present, such two types of $R^{F1}O$ may be arranged randomly, alternately or in blocks.

From the viewpoint of further excellent abrasion resistance, fingerprint stain removability and lubricity of the surface layer, $(R^{F1}O)_{m1}$ is preferably $\{(CF_2O)_{m11}(CF_2CF_2O)_{m12}(CF_2CF_2CF_2O)_{m13}(CF_2CF_2CF_2CF_2O)_{m14}\}$, $(CF_2CF_2O)_{m16}$, $(CF_2CF_2CF_2O)_{m17}$ or $(CF_2CF_2O—CF_2CF_2CF_2CF_2O)_{m15}(CF_2CF_2O)$, more preferably $\{(CF_2O)_{m11}(CF_2CF_2O)_{m12}(CF_2CF_2CF_2O)_{m13}(CF_2CF_2CF_2CF_2O)_{m14}\}$ or $(CF_2CF_2O—CF_2CF_2CF_2CF_2O)_{m15}(CF_2CF_2O)$. Particularly preferred is $(CF_2CF_2O—CF_2CF_2CF_2CF_2O)_{m15}(CF_2CF_2O)$ from the viewpoint that the poly(oxyperfluoroalkylene) chain is rigid, the poly(oxyperfluoroalkylene) chain can be closely arranged on the surface of the substrate, and as a result, it is possible to easily increase the number of poly(oxyperfluoroalkylene) chains per unit surface area of the substrate.

Here, each of m11 and m12 is an integer of at least 1, each of m13 and m14 is an integer of 0 or at least 1, and m11+m12+m13+m14 is an integer of from 2 to 200, and the bonding order of m11 pieces of $CF_2O$, m12 pieces of $CF_2CF_2O$, m13 pieces of $CF_2CF_2CF_2O$ and m14 pieces of $CF_2CF_2CF_2CF_2O$, is not limited. Each of m16 and m17 is an integer of from 2 to 200, and m15 is an integer of from 1 to 99.

a1 is preferably an integer of from 1 to 5 from the viewpoint of excellent water/oil repellency, abrasion resistance, fingerprint stain removability and lubricity, particularly preferably 1 from the viewpoint of easy production of the compound (1).

$Z^1$ may be any group unless the effect of the present invention is impaired, and any group connecting a poly(oxyperfluoroalkylene) chain with a hydrolyzable silyl group in a known fluoroether compound may be applied.

$Z^1$ may, for example, be $-Q^{11}CX_2O(CH_2)_3—$, $-Q^{11}CX_2OCH_2CH(CH_3)—$, $-Q^{11}C(O)NHC_kH_{2k}—$, $-Q^{11}(CH_2)_2—$, or $-Q^{11}(CH_2)_3—$ as a connecting group in the after-mentioned compounds (1-1) to (1-5).

$SiR^1{}_{n1}L^1{}_{3-n1}$ is a hydrolyzable silyl group.

The monovalent hydrocarbon group of $R^1$ may, for example, be an alkyl group, a cycloalkyl group, an alkenyl group or an allyl group.

$R^1$ is preferably a monovalent hydrocarbon group, particularly preferably a monovalent saturated hydrocarbon group. The number of carbon atoms in the monovalent saturated hydrocarbon group is preferably from 1 to 6, more preferably from 1 to 3, particularly preferably from 1 to 2. When the number of carbon atoms in $R^1$ is within the above range, production of the compound (1) is easy.

The hydrolyzable group as $L^1$ is a group which becomes a hydroxy group by a hydrolysis reaction. That is, $Si-L^1$ at the terminal of the compound (1) becomes a silanol group (Si—OH) by a hydrolysis reaction. The silanol group is further intermolecularly reacted to form a Si—O—Si bond. Further, the silanol group undergoes a dehydration condensation reaction with a hydroxy group on the surface of the substrate (substrate-OH) to form a chemical bond (substrate-O—Si). The hydrolyzable group as $L^1$ may, for example, be an alkoxy group, a halogen atom, an acyl group or an isocyanate group (—NCO).

$L^1$ is preferably a $C_{1-4}$ alkoxy group or a halogen atom, from the viewpoint of easy production of the compound (1). The halogen atom is particularly preferably a chlorine atom. $L^1$ is preferably a $C_{1-4}$ alkoxy group from the viewpoint of less outgassing during coating and excellent storage stability of the compound (1), particularly preferably an ethoxy group in a case where long time storage stability of the compound (1) is needed, and particularly preferably a methoxy group in order to shorten the reaction time after coating.

n1 is particularly preferably 0. By the presence of a plurality of $L^1$ in one hydrolyzable silyl group, adhesion to the substrate becomes stronger.

The compound (1) may, for example, be a fluoroether compound described in WO2013/042732, WO2013/121984, WO2013/121985, WO2013/121986, WO2014/163004, WO2015/087902 or JP2014-080473, a linear fluorooxyalkylene group-containing polymer described in JP-A-2012-072272, a compound described in WO2014/163004, a fluorinated organosilane compound described in Patent Document 2, or a fluorooxyalkylene group-containing polymer modified silane described in WO2011/059430, JP-A-2013-18743 or JP-A-2013-144726.

A commercial product of the compound (1) may, for example, be Afluid (registered trademark) S550 manufactured by Asahi Glass Company, Limited, OPTOOL (registered trademark) DSX or OPTOOL (registered trademark) AES manufactured by Daikin Industries, LTD., 2634 Coating manufactured by Dow Corning Toray Co., Ltd. or KY-178 manufactured by Shin-Etsu Chemical Co., Ltd.

From the viewpoint of easy production, the compound (1) is preferably the compound (1-1) to the compound (1-5).

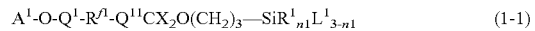

$$A^1\text{-O-}Q^1\text{-}R^{f1}\text{-}Q^{11}CX_2O(CH_2)_3—SiR^1{}_{n1}L^1{}_{3-n1} \quad (1\text{-}1)$$

$$A^1\text{-O-}Q^1\text{-}R^{f1}\text{-}Q^{11}CX_2OCH_2CH(CH_3)—SiR^1{}_{n1}L^1{}_{3-n1} \quad (1\text{-}2)$$

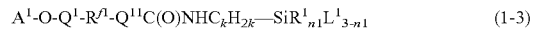

$$A^1\text{-O-}Q^1\text{-}R^{f1}\text{-}Q^{11}C(O)NHC_kH_{2k}—SiR^1{}_{n1}L^1{}_{3-n1} \quad (1\text{-}3)$$

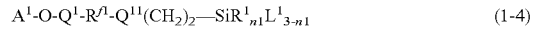

$$A^1\text{-O-}Q^1\text{-}R^{f1}\text{-}Q^{11}(CH_2)_2—SiR^1{}_{n1}L^1{}_{3-n1} \quad (1\text{-}4)$$

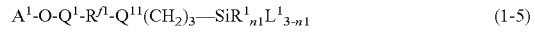

$$A^1\text{-O-}Q^1\text{-}R^{f1}\text{-}Q^{11}(CH_2)_3—SiR^1{}_{n1}L^1{}_{3-n1} \quad (1\text{-}5)$$

wherein $A^1$, $Q^1$, $R^{f1}$, $R^1$, $L^1$ and n1 are the same as in the above formula (1), $Q^{11}$ is a perfluoroalkylene group, $CX_2$ is CFH or $CH_2$, and k is an integrin of at least 1.

$Q^{11}$ is preferably a $C_{1-20}$ perfluoroalkylene group. With a view to sufficiently imparting an initial water/oil repellency, abrasion resistance and fingerprint stain removability on the surface layer, $—CF_2—$, $—CF_2CF_2—$ or $—CF_2CF_2CF_2—$ is preferred.

k is preferably an integer of from 1 to 6.

The compound (1) may be produced by a known production method. For example, the compounds (1-1) to (1-5) may be produced by production methods described in WO2013/121984, WO2013/121985, WO2013/121986 and WO2014/163004.

(Compound (2))

The compound (2) is a compound represented by the following formula (2):

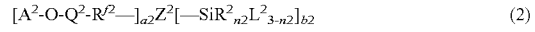

$$[A^2\text{-O-}Q^2\text{-}R^{f2}—]_{a2}Z^2[—SiR^2{}_{n2}L^2{}_{3-n2}]_{b2} \quad (2)$$

wherein $A^2$, $Q^2$ and a2 are the same as $A^1$, $Q^1$ and a1 in the compound (1), and preferred groups and numerical ranges are also the same as in the compound (1).

$R^{f2}$ is preferably $(R^{F2}O)_{m2}$ (in which $R^{F2}$ is a $C_{1-6}$ perfluoroalkylene group, m2 is an integer of from 2 to 200, and which may be composed of at least two types of $R^{F2}O$ having different number of carbon atoms), from the viewpoint of further excellent abrasion resistance and fingerprint stain removability of the surface layer.

$R^{F2}$ and m2 are the same as $R^{F1}$ and m1 in the compound (1), and preferred groups and numerical ranges are also the same as in the compound (1).

In $(R^{F2}O)_{m2}$, in a case where at least two types of $R^{F2}O$ having different number of carbon atoms are present, the bonding order of such plural types of $R^{F2}O$ is not limited. For example, in a case where two types of $R^{F2}O$ are present, the two types of $R^{F2}O$ may be arranged randomly, alternately or in blocks.

From the viewpoint of further excellent abrasion resistance, fingerprint stain removability and lubricity of the surface layer, $(R^{F2}O)_{m2}$ is preferably $\{(CF_2O)_{m21}(CF_2CF_2O)_{m22}(CF_2CF_2CF_2O)_{m23}(CF_2CF_2CF_2CF_2O)_{m24}\}$, $(CF_2CF_2O)_{m26}$, $(CF_2CF_2CF_2O)_{m27}$ or $(CF_2CF_2O-CF_2CF_2CF_2CF_2O)_{m25}(CF_2CF_2O)$, more preferably $\{(CF_2O)_{m21}(CF_2CF_2O)_{m22}(CF_2CF_2CF_2O)_{m23}(CF_2CF_2CF_2CF_2O)_{m24}\}$ or $(CF_2CF_2O-CF_2CF_2CF_2CF_2O)_{m25}(CF_2CF_2O)$. Particularly preferred is $(CF_2CF_2O-CF_2CF_2CF_2CF_2O)_{m25}(CF_2CF_2O)$ from the viewpoint that the poly(oxyperfluoroalkylene) chain is rigid, the poly(oxyperfluoroalkylene) chain can be closely arranged on the surface of a substrate, and as a result, it is possible to easily increase the number of poly(oxyperfluoroalkylene) chains per unit surface area of the substrate.

Here, each of m21 and m22 is an integer of at least 1, each of m23 and m24 is an integer of 0 or at least 1, m21+m22+m23+m24 is an integer of from 2 to 200, and the bonding order of m21 pieces of $CF_2O$, m22 pieces of $CF_2CF_2O$, m23 pieces of $CF_2CF_2CF_2O$ and m24 pieces of $CF_2CF_2CF_2CF_2O$ is not limited. Each of m26 and m27 is an integer of from 2 to 200, and m25 is an integer of from 1 to 99.

$Z^2$ may be any group unless the effect of the present invention is impaired, and any group connecting a poly(oxyperfluoroalkylene) chain with a plurality of hydrolyzable silyl groups in a known fluoroether compound may be applicable.

$Z^2$ may, for example, be $-Q^{21}-[C(O)N(R^{21})]_p-R^{22}-C[-R^{23}-]_3$ or $-Q^{22}-R^{24}-N[-R^{25}-]_2$ as a connecting group in the after-mentioned compounds (2-1) to (2-2).

$SiR^2_{n2}L^2_{3-n2}$ is a hydrolyzable silyl group.

$R^2$ and $L^2$ are the same as $R^1$ and $L^1$ in the compound (1), and preferred groups and numerical ranges are also the same.

n2 is preferably 0 or 1, particularly preferably 0. By the presence of a plurality of $L^2$ in one hydrolyzable silyl group, adhesion to the substrate becomes stronger.

b2 is preferably an integer of from 2 to 4, more preferably 2 or 3, particularly preferably 3 from the viewpoint of abrasion resistance.

As the compound (2), the after-mentioned compounds (2-1) to (2-2), a perfluoropolyether group-containing silane compound described in Patent Document 1, a fluoropolyether group-containing polymer modified silane described in JP-A-2015-199906 or JP-A-2015-214664, a compound described in U.S. Patent Application Publication No. 2010/0129672 and a fluoropolyether group-containing polymer modified silane described in JP-A-2015-129230 may, for example, be mentioned.

A commercial product of the compound (2) may, for example, be OPTOOL (registered trademark) UD509 manufactured by Daikin Industries, LTD., and KY-185, KY-195 and KY-1900 manufactured by Shin-Etsu Chemical Co., Ltd.

The compound (2) is preferably the compounds (2-1) to (2-2) from the viewpoint of excellent water/oil repellency, abrasion resistance, fingerprint stain removability and lubricity.

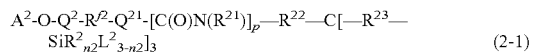

$$A^2-O-Q^2-R^{f2}-Q^{21}-[C(O)N(R^{21})]_p-R^{22}-C[-R^{23}-SiR^2_{n2}L^2_{3-n2}]_3 \tag{2-1}$$

$$A^2-O-Q^2-R^{f2}-Q^{22}-R^{24}-N[-R^{25}-SiR^2_{n2}L^2_{3-n2}]_2 \tag{2-2}$$

When p is 0, $Q^{21}$ is a perfluoroalkylene group having a number of carbon atoms being 1 in a case where $R^{f2}$ is $(R^{F2}O)_{m2}$ and further $R^{f2}$ is $\{(CF_2O)_{m21}(CF_2CF_2O)_{m22}\}$ and $(CF_2CF_2O)_{m23}$, $Q^{21}$ is a perfluoroalkylene group having a number of carbon atoms being 2 in a case where $R^{f2}$ is $(CF_2CF_2CF_2O)_{m24}$, and $Q^{21}$ is a linear perfluoroalkylene group having a number of carbon atoms being 3 in a case where $R^{f2}$ is $(CF_2CF_2O-CF_2CF_2CF_2CF_2O)_{m25}(CF_2CF_2O)$.

When p is 1, $Q^{21}$ may be the following group.
(i) A perfluoroalkylene group
(ii) A group having $R^FCH_2O$ (provided that $R^F$ is a perfluoroalkylene group) on the side bonded to $R^{f2}$ and having a fluoroalkylene group (which may have an etheric oxygen atom between carbon atoms) containing one or more hydrogen atoms on the side bonded to $C(O)N(R^1)$.

When $Q^{21}$ is (ii), the following groups are preferred from the viewpoint of easy production of the compound (2-1).

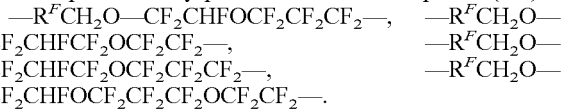

$-R^FCH_2O-CF_2CHFOCF_2CF_2CF_2-$, $-R^FCH_2O-CF_2CHFCF_2OCF_2CF_2-$, $-R^FCH_2O-CF_2CHFCF_2OCF_2CF_2CF_2-$, $-R^FCH_2O-CF_2CHFOCF_2CF_2CF_2OCF_2CF_2-$.

When p is 0 or 1, there is no substantial difference in characteristics of the compound (2-1). When p is 1, the compound (2-1) has an amide bond, but at least one fluorine atom is bonded to the terminal carbon atom of $Q^{21}$ on the side bonded to $[C(O)N(R^1)]$, whereby the polarity of the amide bond tends to be small, and the water/oil repellency of the surface layer is less likely to be low. Whether p should be 0 or 1, may be selected from the viewpoint of easy production.

$R^{21}$ is preferably a hydrogen atom from the viewpoint of easy production of the compound (2-1).

When $R^{21}$ is an alkyl group, such an alkyl group is preferably a $C_{1-4}$ alkyl group.

When p is 0, $R^{22}$ is preferably a single bond, or a group selected from the group consisting of $-CH_2O-$, $-CH_2OCH_2-$, $-CH_2OCH_2CH_2O-$ and $-CH_2OCH_2CH_2OCH_2-$ (provided that the left side is bonded to $Q^{21}$), from the viewpoint of easy production of the compound (2-1).

When p is 1, $R^{22}$ is preferably a single bond, or a group selected from the group consisting of $-CH_2-$ and $-CH_2CH_2-$, from the viewpoint of easy production of the compound (2-1).

$R^{23}$ is preferably a group selected from the group consisting of $-CH_2CH_2-$, $-CH_2CH_2CH_2-$, $-CH_2OCH_2CH_2CH_2-$ and $-OCH_2CH_2CH_2-$ (provided that the right side is bonded to Si), from the viewpoint of easy production of the compound (2-1).

$R^{23}$ is particularly preferably one having no etheric oxygen atoms, from the viewpoint of excellent light resistance of the surface layer.

Three pieces of $R^{23}$ in the compound (2-1) may be the same or different.

$Q^{22}$ is a perfluoroalkylene group having a number of carbon atoms being 1 in a case where $R^{f2}$ is $(R^{F2}O)_{m2}$ and further $R^{f2}$ is $\{(CF_2O)_{m21}(CF_2CF_2O)_{m22}\}$ and $(CF_2CF_2O)_{m23}$, $Q^{22}$ is a perfluoroalkylene group having a number of carbon atoms being 2 when $R'^2$ is $(CF_2CF_2CF_2O)_{m24}$, and $Q^{22}$ is a linear perfluoroalkylene group having a number of carbons being 3 when $Q^{22}$ is $(CF_2CF_2O-CF_2CF_2CF_2CF_2O)_{m25}(CF_2CF_2O)$.

$R^{24}$ is preferably a group selected from the group consisting of $-CH_2-$, $-CH_2CH_2-$, $-CH_2CH_2CH_2-$, $-CH_2OCH_2CH_2-$ and $-CH_2NHCH_2CH_2-$ (provided that the left side is bonded to $Q^{22}$), from the viewpoint of easy production of the compound (2-2).

$R^{24}$ which has no ester bond having high polarity, is insufficient in chemical resistance and light resistance, and therefore the surface layer is excellent in initial water repellency, chemical resistance and light resistance.

$R^{25}$ is preferably $-CH_2CH_2CH_2-$ or $-CH_2CH_2OCH_2CH_2CH_2-$ (provided that the right side is bonded to Si) from the viewpoint of easy production of the compound (2-2).

$R^{25}$ has no ester bond having high polarity and further excellent in chemical resistance and light resistance, and therefore the surface layer is more excellent in initial water repellency, chemical resistance and light resistance.

$R^{25}$ is particularly preferably one having no etheric oxygen atom, from the viewpoint of excellent light resistance of the surface layer.

Two pieces of $R^{25}$ in the compound (2-2) may be the same groups or different groups.

The compounds (2-1) to (2-2) may, for example, be the compounds of the following formulae. Such compounds are preferred from the viewpoint of industrial production efficiency, handling efficiency and further excellent water/oil repellency, abrasion resistance, fingerprint stain removability, lubricity and outer appearance of the surface layer.

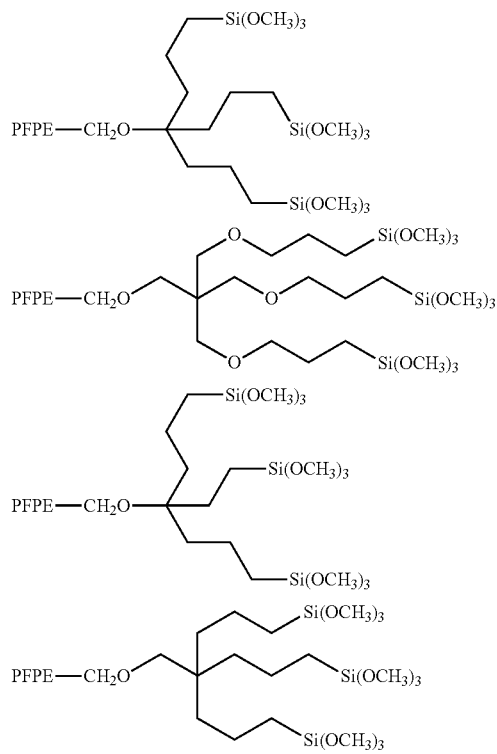

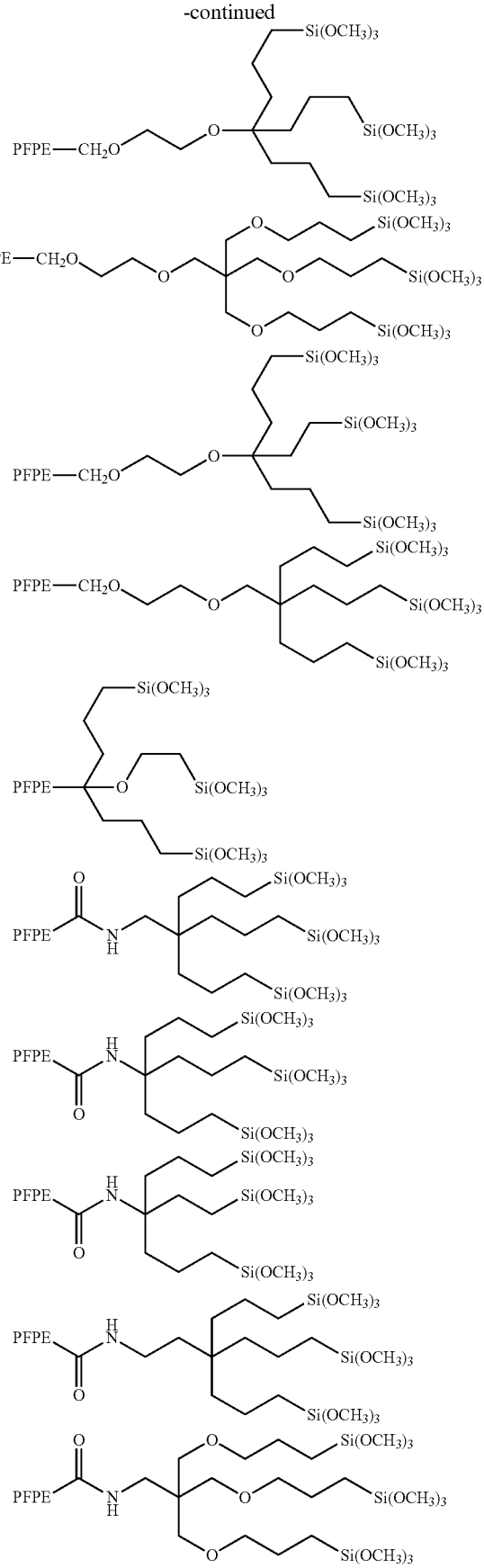

-continued

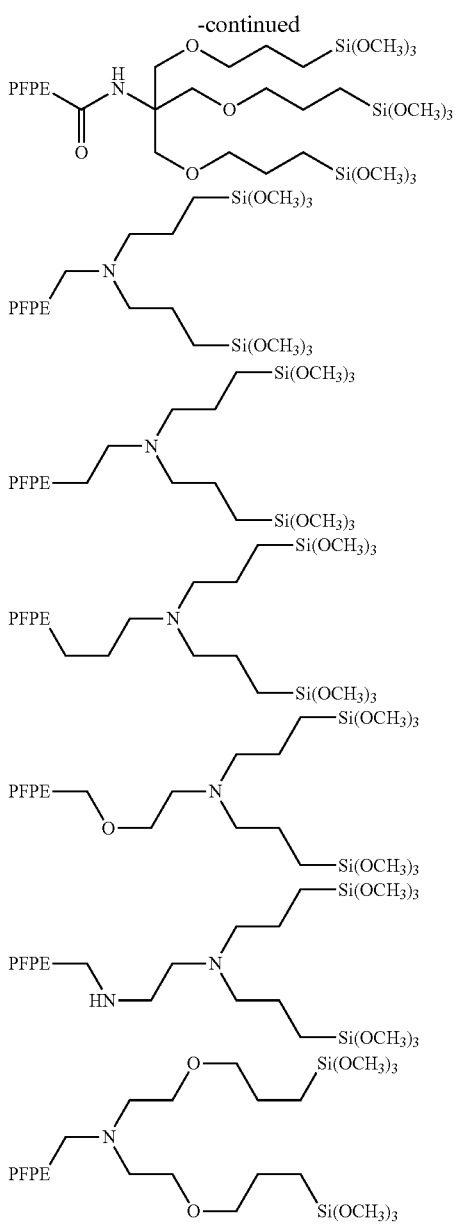

Here, PFPE is a polyfluoropolyether chain, that is $A^2$-O-$Q^2$-$R^{f2}$-$Q^{21}$ (or $Q^{22}$)-.

A preferred embodiment of PFPE is a combination of the above-mentioned preferred $A^2$, $Q^2$, $R^{f2}$ and $Q^{21}$ (or $Q^{22}$).

The compound (2-1) can be produced by combination of known synthesis methods. For example, the compound (2-1) can be produced by obtaining the compound (14) or the compound (15) by the method described in WO2013/121984, followed by the following methods (1) to (4).

$$A^2\text{-O-}Q^2\text{-}R^{f2}\text{—}R^F\text{—C(O)OR} \tag{14}$$

$$A^2\text{-O-}Q^2\text{-}R^{f2}\text{—}R^F\text{—CH}_2\text{OH} \tag{15}$$

Here, $R^F$ is a perfluoroalkylene group, and R is an alkyl group.

<Method (1)>

In the presence of a basic compound, $CF_3SO_2Cl$ is reacted with the compound (15) to obtain the compound (16):

$$A^2\text{-O-}Q^2\text{-}R^{f2}\text{—}R^F\text{—CH}_2\text{OSO}_2\text{CF}_3 \tag{16}$$

In the presence of a basic compound, $HOCH_2C(CH_2OCH_2CH=CH_2)_3$ is reacted with the compound (16) to obtain the compound (17a).

$$A^2\text{-O-}Q^2\text{-}R^{f2}\text{—}R^F\text{—CH}_2\text{OCH}_2\text{—C} \\ (CH_2OCH_2CH=CH_2)_3 \tag{17a}$$

The compound (17a) and $HSiR^2_{n2}L^2_{3-n2}$ are subjected to hydrosilylation reaction to obtain the compound (2-1a).

$$A^2\text{-O-}Q^2\text{-}R^{f2}\text{—}R^F\text{—CH}_2\text{OCH}_2\text{—C} \\ [CH_2OCH_2CH_2CH_2\text{—SiR}^2_{n2}L^2_{3-n2}]_3 \tag{2-1a}$$

Here, $R^F$ corresponds to $Q^{21}$

<Method (2)>

$HOCH_2C(CH_2CH=CH_2)_3$ and $(CF_3SO_2)_2O$ are reacted to obtain the compound (20).

$$CF_3SO_2OCH_2C(CH_2CH=CH_2)_3 \tag{20}$$

In the presence of a basic compound, the compound (15) is reacted with the compound (20) to obtain the compound (17b).

$$A^2\text{-O-}Q^2\text{-}R^{f2}\text{—}R^F\text{—CH}_2\text{OCH}_2\text{—C(CH}_2\text{CH=CH}_2)_3 \tag{17b}$$

The compound (17b) and $HSiR^2_{n2}L^2_{3-n2}$ are subjected to hydrosilylation reaction to obtain the compound (2-1b).

$$A^2\text{-O-}Q^2R^{f2}\text{—}R^F\text{—CH}_2\text{OCH}_2\text{—C[CH}_2\text{CH}_2\text{CH}_2\text{—} \\ SiR^2_{n2}L^2_{3-n2}]_3 \tag{2-1b}$$

Here, $R^F$ corresponds to $Q^{21}$

<Method (3)>

The compound (14) is reacted with $H_2N\text{—}R^{22}\text{—C}(CH_2CH=CH_2)_3$ to obtain the compound (17c).

$$A^2\text{-O-}Q^2R^{f2}\text{—}R^F\text{—C(O)NH—}R^{22}\text{—C} \\ (CH_2CH=CH_2)_3 \tag{17c}$$

The compound (17c) and $HSiR^2_{n2}L^2_{3-n2}$ are subjected to hydrosilylation reaction to obtain the compound (2-1c).

$$A^2\text{-O-}Q^2\text{-}R^{f2}\text{—}R^F\text{—C(O)NH—}R^{22}\text{—C} \\ [CH_2CH_2CH_2\text{—SiR}^2_{n2}L^2_{3-n2}]_3 \tag{2-1c}$$

Here, $R^F$ corresponds to $Q^{21}$

<Method (4)>

$CF_2=CFOCF_2CF_2CF_2\text{—C(O)OCH}_3$ and $H_2N\text{—}R^{22}\text{—C}(CH_2CH=CH_2)_3$ are reacted to obtain the compound (30).

$$CF_2=CFOCF_2CF_2CF_2\text{—C(O)NH—}R^{22}\text{—C} \\ (CH_2CH=CH_2)_3 \tag{30}$$

In the presence of a basic compound, the compound (30) is reacted with the compound (15) to obtain the compound (17d).

$$A^2\text{-O-}Q^2\text{-}R^{f2}\text{—}R^FCH_2OCF_2CHFOCF_2CF_2CF_2\text{—C} \\ (O)NH\text{—}R^{22}\text{—C(CH}_2\text{CH=CH}_2)_3 \tag{17d}$$

The compound (17d) and $HSiR^2_{n2}L^2_{3-n2}$ are subjected to hydrosilylation reaction to obtain the compound (2-1d).

$$A^2\text{-O-}Q^2\text{-}R^{f2}\text{—}R^FCH_2OCF_2CHFOCF_2CF_2CF_2\text{—C} \\ (O)NH\text{—}R^{22}\text{—C[CH}_2\text{CH}_2\text{CH}_2\text{—SiR}^2_{n2}L^2_{3-n2}]_3 \tag{2-1d}$$

Here, $R^FCH_2OCF_2CHFOCF_2CF_2CF_2$ corresponds to $Q^{21}$

<Production Method of Compound (2-2)>

The compound (2-2) can be produced by combination of known synthesis methods. For example, the compound (2-2) can be produced by obtaining the compound (16) in the same manner as in the above-mentioned method (1) of the compound (2-1), followed by the following method (5).

$$A^2\text{-O-}Q^2\text{-}R^{f2}\text{—}R^F\text{—CH}_2\text{OSO}_2\text{CF}_3 \tag{16}$$

15

<Method (5)>
In the presence of a basic compound, $HN(CH_2CH\!\!=\!\!CH_2)_2$ is reacted with the compound (16) to obtain the compound (17e).

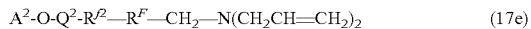
$$A^2\text{-}O\text{-}Q^2\text{-}R^{f2}\text{—}R^F\text{—}CH_2\text{—}N(CH_2CH\!\!=\!\!CH_2)_2 \qquad (17e)$$

The compound (17e) and $HSiR^2{}_{n2}L^2{}_{3-n2}$ are subjected to hydrosilylation reaction to obtain the compound (2-2e).

$$A^2\text{-}O\text{-}Q^2\text{-}R^{f2}\text{—}R^F\text{—}CH_2\text{—}N[CH_2CH_2CH_2\text{—}\\ SiR^2{}_{n2}L^2{}_{3-n2}]_2 \qquad (2\text{-}2e)$$

Here, $R^F$ corresponds to $Q^{22}$.

(Fluoroether Compound)

The compound (1) may be a single compound, or a mixture composed of at least two types of the compound (1) different in A, $Q^1$, $R^{f1}$, $Z^1$, $SiR^1{}_{n1}L^1{}_{3-n1}$, etc.

In the present invention, the compound (1) being a single compound means the same group of compounds except having a distribution in the number of oxyperfluoroalkylene groups constituting the poly(oxyperfluoroalkylene) chain. For example, in the case of the compound (1-1), when $(R^{f1}O)_{m1}$ is $\{(CF_2O)_{m11}(CF_2CF_2O)_{m12}\}$, it means the same group of compounds except having a distribution in m11 and m12 and when represented by $\{(CF_2O)_{m11/m1}(CF_2CF_2O)_{m12/m1}\}_{m1}$, it means the same group of compounds except having a distribution in the number of m1.

Likewise, the compound (2) may be a single compound, or a mixture composed of at least two types of the compound (2) different in $A^2$, $Q^2$, $R^{f2}$, a2, $Z^2$, $SiR^2{}_{n2}L^2{}_{3-n2}$, etc.

The number average molecular weight of the compound (1) is preferably from 500 to 20,000, more preferably from 800 to 10,000, particularly preferably from 1,000 to 8,000. When the number average molecular weight is within the above range, abrasion resistance will be excellent.

The number average molecular weight of the compound (2) is preferably from 500 to 20,000, more preferably from 800 to 10,000, particularly preferably from 1,000 to 8,000. When the number average molecular weight is within the above range, abrasion resistance will be excellent.

The absolute value of the difference between the number average molecular weight of the compound (1) and the number average molecular weight of the compound (2) is preferably at most 2,000, more preferably at most 1,000, particularly preferably at most 500. When a surface layer is formed by dry coating, a compound having a smaller molecular weight is relatively quickly deposited on the surface of a substrate, and a compound having a larger molecular weight is relatively slowly deposited on the surface of the substrate. Therefore, in a case where the molecular weight is significantly different between the compound (1) and the compound (2), the compound having a smaller molecular weight is first deposited on the surface of the substrate, and it is therefore difficult to deposit the compound having a larger molecular weight on the surface of the substrate. When the absolute value of the difference between the number average molecular weight of the compound (1) and the number average molecular weight of the compound (2) becomes smaller, the compound (1) and the compound (2) can be easily deposited uniformly on the surface of the substrate at a desired ratio.

The present composition may contain a fluoroether compound other than the compound (1) and the compound (2) (hereinafter, referred to also as "other fluoroether compound") within a range not to impair the effect of the present invention. Such other fluoroether compound may, for example, be a fluoroether compound produced as a by-product in the process for producing the compound (1) or the compound (2), or a known (particularly commercially available) fluoroether compound to be used in the same applications as the compound (1) and the compound (2). It is preferred that such other fluoroether compound is a compound which is less likely to deteriorate the properties of the compound (1) and the compound (2), and of which the relative content of such other fluoroether compound to the compound (1) and the compound (2) in the present composition is such an amount as to less likely to deteriorate the properties of the compound (1) and the compound (2).

In a case where such other fluoroether compound is the fluoroether compound produced as a by-product in the process for producing the compound (1) or the compound (2), the compound (1) or the compound (2) can be easily purified in the production of the compound (1) or the compound (2), and further the purification process can be simplified. In a case where such other fluoroether compound is the known fluoroether compound to be used in the same applications as the compound (1) and the compound (2), such other fluoroether compound may exhibit such a new function or effect as to supplement the properties of the compound (1) and the compound (2).

The present composition may contain impurities other than the compound (1), the compound (2) and such other fluoroether compounds. The impurities may, for example, be a compound which is unavoidable in the production of the compound (1), the compound (2) and such other fluoroether compounds. The present composition contains no liquid medium as mentioned below.

(Composition of Present Composition)

The content of the compound (1) is from 10 to 90 mol %, preferably from 20 to 85 mol %, particularly preferably from 40 to 75 mol %, to the total of the compound (1) and the compound (2). When the content of the compound (1) is at least the lower limit value of the above range, it is possible to form a surface layer excellent in light resistance. When the content of the compound (1) is at most the upper limit value of the above range, it is possible to form a surface layer excellent in abrasion resistance.

That is, the abrasion resistance of the surface layer is secured by the compound (2) having a plurality of hydrolyzable silyl groups, and at the same time, the light resistance is improved by interposing the compound (1) having one hydrolyzable silyl group into a space between the compound (2) introduced to the surface of the substrate and thereby increasing the poly(oxyperfluoroalkylene) chain per unit surface area of the substrate.

In the production of the compound (2), the hydrolyzable group may not completely be introduced due to hydrosilylation, and therefore a compound corresponding to the compound (1) having only one hydrolyzable group introduced, may be produced. In the present invention, from the viewpoint that the content of the compound (1) in the present composition can be easily adjusted to a desired content, it is preferred to suppress production of a compound corresponding to the compound (1) as a by-product as far as possible, in the production of the compound (2). The content of the compound corresponding to the compound (1) as a by-product in the production of the compound (2), is preferably less than 10 mol %, particularly preferably at most 5 mol %, to the total of the compound (1) and the compound (2).

The total content of the compound (1), the compound (2) and such other fluoroether compound in the present composition is preferably from 80 to 100 mass %, particularly preferably from 85 to 100 mass %. That is, the content of the impurities is preferably at most 20 mass %, particularly preferably at most 15 mass %.

The content of such other fluoroether compound is preferably from 0 to 40 mass %, more preferably from 0 to 30 mass %, particularly preferably from 0 to 20 mass %, to the total of the compound (1), the compound (2) and such other fluoroether compound. That is, the total content of the compound (1) and the compound (2) is preferably from 60 to 100 mass %, more preferably from 70 to 100 mass %, particularly preferably from 80 to 100 mass %.

[Coating Fluid]

The coating fluid of the present invention (hereinafter referred to also as the present coating fluid) contains the present composition and a liquid medium. The present coating fluid may be any fluid and may be a solution or a dispersion.

The concentration of the present composition is preferably from 0.001 to 10 mass %, particularly preferably from 0.1 to 1 mass %, in the coating fluid.

The liquid medium is preferably an organic solvent. The organic solvent may be a fluorinated organic solvent or a non-fluorinated organic solvent, or may contain both solvents.

The fluorinated organic solvent may, for example, be a fluorinated alkane, a fluorinated aromatic compound, a fluoroalkyl ether, a fluorinated alkylamine or a fluoroalcohol.

As the fluorinated alkane, a compound having from 4 to 8 carbon atoms is preferred. Commercially available products may, for example, be $C_6F_{13}H$ (manufactured by Asahi Glass Company, Limited, ASAHIKLIN (registered trademark) AC-2000), $C_6F_{13}C_2H_5$ (manufactured by Asahi Glass Company, Limited, ASAHIKLIN (registered trademark) AC-6000) or $C_2F_5CHFCHFCF_3$ (manufactured by Chemours, Vertrel (registered trademark) XF).

The fluorinated aromatic compound may, for example, be hexafluorobenzene, trifluoromethylbenzene, perfluorotoluene or bis(trifluoromethyl)benzene.

As the fluoroalkyl ether, a $C_{4-12}$ compound is preferred. Commercially available products may, for example, be $CF_3CH_2OCF_2CF_2H$ (manufactured by Asahi Glass Company, Limited, ASAHIKLIN (registered trademark) AE-3000), $C_4F_9OCH_3$ (manufactured by 3M, Novec (registered trademark) 7100), $C_4F_9OC_2H_5$ (manufactured by 3M, Novec (registered trademark) 7200) or $C_2F_5CF(OCH_3)C_3F_7$ (manufactured by 3M, Novec (registered trademark) 7300).

As the fluorinated alkylamine, for example, perfluorotripropylamine or perfluorotributylamine may be mentioned.

The fluoroalcohol may, for example, be 2,2,3,3-tetrafluoropropanol, 2,2,2-trifluoroethanol or hexafluoroisopropanol.

As the non-fluorinated organic solvent, a compound consisting of only hydrogen and carbon atoms, or a compound consisting of only hydrogen, carbon and oxygen atoms, is preferred, and a hydrocarbon-type organic solvent, an alcohol-type organic solvent, a ketone-type organic solvent, an ether-type organic solvent or an ester-type organic solvent may be mentioned.

The present coating fluid contains the liquid medium in an amount of preferably from 90 to 99.999 mass %, particularly preferably from 99 to 99.9 mass %.

The present coating fluid may contain, in addition to the present composition and the liquid medium, other components in a range not to impair the effects of the present invention.

Other components may, for example, be known additives such as acid catalysts or basic catalysts for promoting hydrolysis and condensation reaction of hydrolyzable silyl groups.

In the present coating fluid, the content of such other components is preferably at most 10 mass %, particularly preferably at most 1 mass %.

The solid content concentration in the present coating fluid is preferably from 0.001 to 10 mass %, particularly preferably from 0.01 to 1 mass %. The solid content concentration in the coating fluid is a value calculated from the mass of the coating fluid before heating and the mass of the coating fluid after the heating for 4 hours at 120° C. in a convection dryer. It is possible to calculate the concentration of the present composition from the solid content concentration, and the charged amounts of the present composition and the solvent, etc.

[Article]

The article of the present invention has a surface layer formed from the present composition on the surface of a substrate.

In the present composition, silanol groups (Si—OH) are formed by a hydrolysis reaction of hydrolyzable silyl groups in the compound (1) and the compound (2), and the silanol groups are intermolecularly reacted to form Si—O—Si bonds, or such silanol groups undergo dehydration condensation reactions with hydroxy groups (substrate-OH) on the surface of a substrate to form chemical bonds (substrate-O—Si). That is, the surface layer in the present invention contains the compound (1) and the compound (2) in such a state that a part or all of hydrolyzable silyl groups in the present compound underwent a hydrolysis reaction.

The thickness of the surface layer is preferably from 1 to 100 nm, particularly preferably from 1 to 50 nm. When the thickness of the surface layer is at least the lower limit value of the above range, it is possible to sufficiently obtain the effect by surface treatment. When the thickness of the surface layer is at most the upper limit value of the above range, utilization efficiency becomes high. The thickness of the surface layer can be calculated from the oscillation period of an interference pattern of reflected X-ray obtained by means of an X-ray diffractometer for thin film analysis (manufactured by Rigaku Corporation, ATX-G).

The substrate in the present invention is not particularly limited as long as it is a substrate which is required to have water/oil repellency imparted. The material for the substrate may, for example, be a metal, a resin, glass, sapphire, ceramic, stone, or a composite material thereof. The glass may have been chemically strengthened. On the surface of the substrate, a base film such as $SiO_2$ film may be formed.

As the substrate, a substrate for a touch panel or a substrate for display is preferred, and a substrate for a touch panel is particularly preferred. The substrate for a touch panel has a light-transmitting property. "Having a light-transmitting property" means that the vertical incidence type visible light transmittance in accordance with JIS R 3106: 1998 (ISO 9050: 1990) is at least 25%. As the material for the touch panel substrate, glass or a transparent resin is preferred.

The article of the present invention may be produced, for example, by the following methods.

A method of treating a surface of a substrate by dry coating using the present composition, to obtain an article of the present invention.

A method of applying the present coating fluid to a surface of a substrate by wet coating, followed by drying to obtain an article of the present invention.

The present compositions may be used as they are in dry coating. The present composition is suitable for forming a surface layer excellent in adhesion by dry coating.

The dry coating may, for example, be vacuum deposition, CVD or sputtering. From the viewpoint of suppressing the decomposition of the compound (1) and the compound (2) and from the viewpoint of simplicity of apparatus, a vacuum deposition is suitable.

The wet coating method may, for example, be a spin coating method, a wipe coating method, a spray coating method, a squeegee coating method, a dip coating method, a die coating method, an ink-jet method, a flow coating method, a roll coating method, a casting method, a Langmuir-Blodgett method or a gravure coating method.

In order to improve the abrasion resistance of the surface layer, as the case requires, an operation to promote the reaction between the compounds (1) and (2) and the substrate may be carried out. As such an operation, heating, humidification, light irradiation, etc. may be mentioned. For example, the substrate having a surface layer formed is heated in an atmosphere having moisture, whereby it is possible to accelerate a reaction such as a hydrolysis reaction of hydrolyzable silyl groups to silanol groups, a reaction of silanol groups with hydroxy groups at the surface of the substrate, or a condensation reaction of silanol groups to form siloxane bonds.

Among compounds in the surface layer, compounds which fail to be chemically bonded to other compounds or the substrate may be removed as the case requires, after the surface treatment. The specific method may, for example, be a method of immersing the surface layer in a solvent, a method of letting a solvent flow on the surface layer, or a method of wiping the surface layer with a cloth soaked with a solvent.

EXAMPLES

Now, the present invention will be described in further detail with reference to Examples, but the present invention is not limited to these Examples.

Hereinafter, "%" is "mass %" unless otherwise specified. Further, a mixture made of at least two types of the compound (1) or a mixture made of at least two types of the compound (2) will be referred to as a "compound", and one containing the compound (1) and the compound (2) will be referred to as a "composition".

Ex. 2 to 7, 11 to 12, and 14 to 19 are Examples of the present invention, and Ex. 1, 8, 13 and 20 are Comparative Examples.

Production Example 1: Compound (1-3-1)

The compound (1-3-1) was obtained in the same manner as in the process described in Ex. 6 of WO2013/121984 except that the number of ($CF_2CF_2O$—$CF_2CF_2CF_2CF_2O$) units in the starting materials were changed.

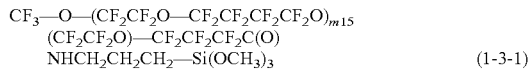
(1-3-1)

NMR Spectrum of Compound (1-3-1):
$^1$H-NMR (300.4 MHz, solvent: heavy chloroform, reference: TMS) δ (ppm): 0.6 (2H), 1.6 (2H), 2.8 (1H), 3.3 (2H), 3.5 (9H).
$^{19}$F-NMR (282.7 MHz, solvent: heavy chloroform, reference: $CFCl_3$) δ (ppm): −56.2 (3F), −84.1 (54F), −89.3 (54F), −91.3 (2F), −120.8 (2F), −126.6 (52F), −127.2 (2F).
Mean value of unit number m15: 13, number average molecular weight of compound (1-3-1): 4,900.

Production Example 2: Compound (1-1-1)

The compound (1-1-1) was obtained in the same manner as in the process described in Ex. 6 of WO2014/163004.

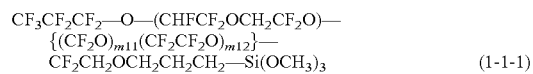
(1-1-1)

Mean value of unit number m11: 21, mean value of unit number m12: 20, number average molecular weight: 4,300.

Production Example 3: Compound (2-1-1)

The compound (14-1) was obtained in the same manner as in the process described in Ex. 6 of WO2013/121984 except that the number of ($CF_2CF_2O$—$CF_2CF_2CF_2CF_2O$) units in the starting materials is changed.

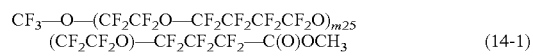
(14-1)

Mean value of unit number m25: 13, number average molecular weight of compound (14-1): 4,700.

Into a 50 mL eggplant flask, 9.0 g of the compound (14-1) and 0.45 g of $H_2N$—$CH_2$—$C(CH_2CH=CH_2)_3$ were put and stirred for 12 hours. From NMR, it was confirmed that all the compound (14-1) was converted to the compound (17c-1).

Further, methanol was formed as a by-product. The resulting solution was diluted with 9.0 g of $CF_3CH_2OCF_2CF_2H$ (AE-3000, manufactured by Asahi Glass Company, Limited), and purified by silica gel column chromatography (developing solvent: AE-3000) to obtain 7.6 g (yield: 84%) of the compound (17c-1).

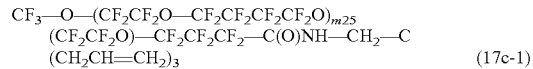
(17c-1)

Mean value of unit number m25: 13, number average molecular weight of compound (17c-1): 4,800.

Into a 10 mL sample tube made of a tetrafluoroethylene/perfluoro(alkoxy vinyl ether) copolymer (hereinafter, referred to also as PFA), 6.0 g of the compound (17c-1), 0.07 g of a xylene solution (platinum content: 2%) of platinum/1,3-divinyl-1,1,3,3-tetramethyldisiloxane complex, 0.78 g of $HSi(OCH_3)_3$, 0.02 g of dimethylsulfoxide and 0.49 g of 1,3-bis(trifluoromethyl)benzene (manufactured by Tokyo Chemical Industry Co., Ltd.) were put and stirred at 40° C. for 10 hours. After completion of the reaction, the solvent, etc. was distilled off under reduced pressure, followed by filtration through a membrane filter of 1.0 μm pore size, to obtain 6.7 g (yield: 100%) of the compound (2-1-1).

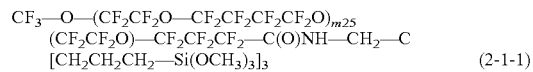
(2-1-1)

NMR Spectrum of Compound (2-1-1):
$^1$H-NMR (300.4 MHz, solvent: $CDCl_3$, reference: TMS) δ (ppm): 0.75 (6H), 1.3 to 1.6 (12H), 3.4 (2H), 3.7 (27H).
$^{19}$F-NMR (282.7 MHz, solvent: $CDCl_3$, reference: $CFCl_3$) δ (ppm): −55.2 (3F), −82.1 (54F), −88.1 (54F), −90.2 (2F), −119.6 (2F), −125.4 (52F), −126.2 (2F).
Mean value of unit number m25: 13, number average molecular weight of compound (2-1-1): 5,400.

Production Example 4: Compound (2-1-2)

The compound (15-1) was obtained in the same manner as in Ex. 7-1 of WO2013/121984.

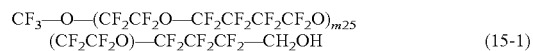
(15-1)

Mean value of unit number m25: 13, number average molecular weight of compound (15-1): 4,700.

Into a 200 mL eggplant flask, 10 g of HOCH$_2$C(CH$_2$CH=CH$_2$)$_3$, 20.0 g of 1,3-bis(trifluoromethyl)benzene (manufactured by Tokyo Chemical Industry Co., Ltd.) and 25.5 g of (CF$_3$SO$_2$)$_2$O were put, and under a nitrogen atmosphere and at 0° C., 19.3 g of 2,6-lutidine was dropwise added thereto. The mixture was heated to room temperature, followed by stirring for one hour. After completion of the reaction, washing with water was conducted, and the organic phase was collected and concentrated by an evaporator. This concentrate was purified by silica gel column chromatography (developing solvent: hexane/ethyl acetate=85/15 (mass ratio)) to obtain 15.1 g (yield: 85%) of the compound (20).

$$CF_3SO_2OCH_2C(CH_2CH=CH_2)_3 \quad (20)$$

In a 20 mL eggplant flask, 1.3 g of cesium carbonate, 2.7 g of the compound (15-1) and 0.17 g of the compound (20) were suspended in 4.2 g of AC-6000, and heated to 90° C., followed by stirring for 4 hours. After completion of the reaction, washing with water was conducted, and an organic phase was collected and concentrated by an evaporator. This concentrate was purified by silica gel column chromatography (developing solvent: AE-3000/ethyl acetate=99/1 (mass ratio)) to obtain 1.7 g (yield: 57%) of the compound (17b-1).

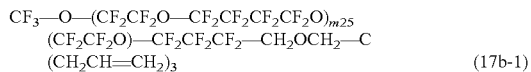

$$CF_3\text{—}O\text{—}(CF_2CF_2O\text{—}CF_2CF_2CF_2CF_2O)_{m25}$$
$$(CF_2CF_2O)\text{—}CF_2CF_2CF_2\text{—}CH_2OCH_2\text{—}C$$
$$(CH_2CH=CH_2)_3 \quad (17b\text{-}1)$$

Mean value of unit number m25: 13, number average molecular weight of compound (17b-1): 4,850.

Into a 10 mL container made of PFA, 1.6 g of the compound (17b-1), 0.002 g of a xylene solution (platinum content: 2%) of a platinum/1,3-divinyl-1,1,3,3-tetramethyldisiloxane complex, 0.20 g of HSi(OCH$_3$)$_3$, 0.003 g of aniline and 0.15 g of 1,3-bis(trifluoromethyl)benzene (manufactured by Tokyo Chemical Industry Co., Ltd.) were put and stirred at 40° C. for 4 hours. After completion of the reaction, the solvent, etc. were distilled off under reduced pressure, followed by filtration through a membrane filter having a pore size of 0.2 μm, to obtain 1.6 g (yield 95%) of the compound (2-1-2) wherein three allyl groups of the compound (17b-1) were hydrosilylated. The conversion in the hydrosilylation was 100%, and no compound (17b-1) remained. The selectivity in the hydrosilylation was 100%, and no by-product wherein some or all of three allyl groups of the compound (17b-1) were isomerized to an inner olefin (—CH=CHCH$_3$), was produced.

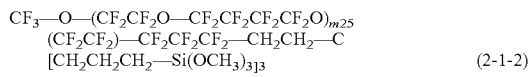

$$CF_3\text{—}O\text{—}(CF_2CF_2O\text{—}CF_2CF_2CF_2CF_2O)_{m25}$$
$$(CF_2CF_2)\text{—}CF_2CF_2CF_2\text{—}CH_2CH_2\text{—}C$$
$$[CH_2CH_2CH_2\text{—}Si(OCH_3)_3]_3 \quad (2\text{-}1\text{-}2)$$

NMR Spectrum of Compound (2-1-2):
$^1$H-NMR (300.4 MHz, solvent: CDCl$_3$, reference: TMS) δ (ppm): 0.7 (6H), 1.7 (6H), 3.4-3.8 (37H).
$^{19}$F-NMR (282.7 MHz, solvent: CDCl$_3$, reference: C$_6$F$_6$) δ (ppm): −56.3 (3F), −84.0 (54F), −89.2 (54F), −91.4 (2F), −120.5 (2F), −126.6 (52F), −128.6 (2F).

Mean value of unit number m25: 13, number average molecular weight of compound (2-1-2): 5,210.

Production Example 5: Compound (2-2-1)

Into a 300 mL three-necked flask, 24.4 g of a 24% KOH aqueous solution, 33 g of tert-butyl alcohol, 220 g of the compound (41) (manufactured by Solvay Solexis, FLUOROLINK (registered trademark) D4000) were put, and 19.4 g of CF$_3$CF$_2$CF$_2$—O— CF=CF$_2$ (manufactured by Tokyo Chemical Industry Co., Ltd.) was added. Under a nitrogen atmosphere, the mixture was stirred at 60° C. for 8 hours. After conducting washing once with dilute aqueous hydrochloric acid, an organic phase was collected and concentrated by an evaporator to obtain 233 g of a crude product (a). The crude product was fractionated by developing it by silica gel column chromatography. As the developing solvents, C$_6$F$_{13}$CH$_2$CH$_3$ (manufactured by Asahi Glass Company, Limited, AC-6000), AC-6000/CF$_3$CH$_2$OCF$_2$CF$_2$H (manufactured by Asahi Glass Company, Limited, AE-3000)=1/2 (mass ratio) and AE-3000/ethyl acetate=9/1 (mass ratio) were used in this order. With respect to each fraction, the structures of terminal groups and the mean values of unit numbers (m21, m22) of structural units were obtained from the integral values of $^1$H-NMR and $^{19}$F-NMR. It was found that in the crude product, the compound (15-2), the compound (42) and the compound (41) were contained in amounts of 42 mol %, 49 mol % and 9 mol %, respectively. 98.6 g (yield: 44.8%) of the compound (15-2) and 51.9 g (yield: 23.6%) of the compound (42) were obtained.

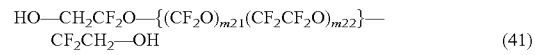

$$HO\text{—}CH_2CF_2O\text{—}\{(CF_2O)_{m21}(CF_2CF_2O)_{m22}\}\text{—}$$
$$CF_2CH_2\text{—}OH \quad (41)$$

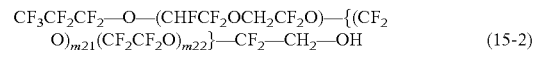

$$CF_3CF_2CF_2\text{—}O\text{—}(CHFCF_2OCH_2CF_2O)\text{—}\{(CF_2O)_{m21}(CF_2CF_2O)_{m22}\}\text{—}CF_2\text{—}CH_2\text{—}OH \quad (15\text{-}2)$$

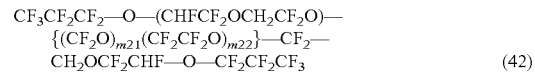

$$CF_3CF_2CF_2\text{—}O\text{—}(CHFCF_2OCH_2CF_2O)\text{—}$$
$$\{(CF_2O)_{m21}(CF_2CF_2O)_{m22}\}\text{—}CF_2\text{—}$$
$$CH_2OCF_2CHF\text{—}O\text{—}CF_2CF_2CF_3 \quad (42)$$

Mean value of unit number m21: 21, mean value of the unit number m22: 20, number average molecular weight of the compound (15-2): 4,150.

Into a 100 mL two-necked eggplant flask, 30.0 g of the compound (15-2), 30.0 g of 1,3-bis(trifluoromethyl)benzene (manufactured by Tokyo Chemical Industry Co., Ltd.), 1.44 g of CF$_3$SO$_2$Cl (manufactured by Wako Pure Chemical Industries, Ltd.) and 1.45 g of triethylamine were put and stirred at room temperature for 4 hours under a nitrogen atmosphere. After completion of the reaction, 15 g of AK-225 was added, washing was conducted once with water and saturated brine, respectively, and the organic phase was collected. The collected organic phase was concentrated by an evaporator to obtain 30.6 g (yield: 99%) of the compound (16-1).

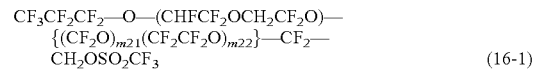

$$CF_3CF_2CF_2\text{—}O\text{—}(CHFCF_2OCH_2CF_2O)\text{—}$$
$$\{(CF_2O)_{m21}(CF_2CF_2O)_{m22}\}\text{—}CF_2\text{—}$$
$$CH_2OSO_2CF_3 \quad (16\text{-}1)$$

Mean value of the unit number m21: 21, mean value of the unit number m22: 20, number average molecular weight of the compound (16-1): 4,280.

Into a 50 mL eggplant flask, 15.0 g of the compound (16-1), 15.0 g of 1,3-bis(trifluoromethyl)benzene (manufactured by Tokyo Chemical Industry Co., Ltd.), 2.31 g of HN(CH$_2$CH=CH$_2$)$_2$ (manufactured by Tokyo Chemical Industry Co., Ltd.) and 0.69 g of triethylamine were put, and under a nitrogen atmosphere, the mixture was stirred at 90° C. for 16 hours. After completion of the reaction, 15 g of AK-225 was added, washing was conducted once with water and saturated brine, respectively, and the organic phase was collected. Thereafter, the organic phase was mixed with 1.5 g of silica gel, followed by filtration through a filter to recover the organic phase. This organic phase recovered was concentrated by an evaporator to obtain 14.1 g (yield: 95%) of the compound (17e-1).

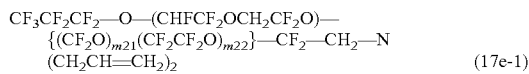

(17e-1)

Mean value of unit number m21: 21, mean value of the unit number m22: 20, number average molecular weight of compound (17e-1): 4,230.

Into a 100 mL eggplant flask made of PFA, 12.0 g of the compound (17e-1), 0.032 g of a xylene solution (platinum content: 2%) of a platinum/1,3-divinyl-1,1,3,3-tetramethyl-disiloxane complex, 1.3 g of HSi(OCH$_3$)$_3$, 0.01 g of aniline and 0.5 g of 1,3-bis(trifluoromethyl)benzene (manufactured by Tokyo Chemical Industry Co., Ltd.), were put and stirred at 70° C. for 10 hours. After completion of the reaction, the solvent, etc. was distilled off under reduced pressure, followed by filtration through a membrane filter having a pore size of 0.2 μm, to obtain 12.4 g (yield: 98%) of the compound (2-2-1) wherein two allyl groups of the compound (17e-1) were hydrosilylated. The conversion in the hydrosilylation was 100%, and no compound (17e-1) remained.

The selectivity in the hydrosilylation was 100%.

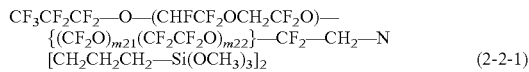

(2-2-1)

Mean value of unit number m21: 21, mean value of unit number m22: 20, number average molecular weight of compound (2-2-1): 4,470.

Ex. 1 to 8

The compound (1) and the compound (2) were mixed in a proportion shown in Table 1 to obtain the composition in Ex. 2 to 7.

Surface treatment of a substrate was conducted using the compound or composition of Ex. 1 to 8, to obtain an article. As the surface treatment method, the following dry coating was employed in each Example. As the substrate, a chemically strengthened glass was employed. With respect to the obtained article, evaporations were conducted by the following methods. The results are shown in Table 1.

(Dry Coating)

Dry coating was conducted by means of a vacuum deposition apparatus (manufactured by ULVAC Co., VTR-350M) (vacuum deposition method). 0.5 g of the compound or composition obtained in each of Ex. 1 to 8 was filled into a molybdenum boat in the vacuum deposition apparatus, and interior of the vacuum deposition apparatus was evacuated to a level of at most 1×10$^{-3}$ Pa. The boat having the compound or the composition placed therein was heated at a temperature raising rate of at most 10° C./min, and at the time when the deposition rate by a quartz oscillator film thickness meter exceeded 1 nm/sec., the shutter was opened to initiate film deposition on the surface of the substrate. At the time when the film thickness became about 50 nm, the shutter was closed to terminate film deposition on the surface of the substrate. The substrate to which the compound or the composition was deposited, was heat-treated at 120° C. for 30 minutes, and then immersed with dichloropentafluoropropane (manufactured by Asahi Glass Company, Limited, AK-225), to obtain an article having a surface layer on the surface of the substrate.

(Evaluation Methods)

<Method for Measuring Contact Angle>

A contact angle of about 2 μL of distilled water or n-hexadecane placed on the surface of the surface layer, was measured using a contact angle measuring apparatus (manufactured by Kyowa Interface Science Co., Ltd. DM-500). Measurements were conducted at five different points on the surface of the surface layer, and the mean value was calculated. For the calculation of the contact angle, a 2θ method was employed.

<Initial Contact Angle>

With respect to the surface layer, the initial water contact angle and the initial n-hexadecane contact angle were measured by the above-mentioned measuring method.

The evaluation standards are as follows.

Initial Water Contact Angle:

⊚ (excellent): at least 115°.

○ (good): at least 110° and less than 115°.

Δ (acceptable): at least 100° and less than 110.

x (poor): less than 100°.

Initial n-Hexadecane Contact Angle:

⊚ (excellent): at least 66°.

○ (good): at least 65° and less than 660.

Δ (acceptable): at least 63° and less than 65°.

x (poor): less than 63°.

<Abrasion Resistance>

With respect to the surface layer, the water contact angle was measured in accordance with JIS L0849: 2013 (ISO 105-X12: 2001) using a reciprocating traverse testing machine (manufactured by KNT Co.), wherein steel wool Bon Star (#0000) was reciprocated 10,000 times under a pressure of 98.07 kPa at a speed of 320 cm/min.

The smaller the decrease in water repellency (water contact angle) after the abrasion is, the smaller the decrease in performance due to the abrasion becomes, whereby the abrasion resistance becomes excellent. The evaluation standards are as follows.

⊚ (excellent): The change in water contact angle after reciprocation of 10,000 times is at most 5.

○ (good): The change in water contact angle after reciprocation of 10,000 times is more than 5° and at most 100.

Δ (acceptable): The change in water contact angle after reciprocation of 10,000 times is more than 10° and at most 20°.

x (poor): The change in water contact angle after reciprocation of 10,000 is more than 20°.

<Outer Appearance>

The haze of an article was measured by a haze meter (manufactured by Toyo Seiki Seisaku-sho, Ltd.). As the haze becomes smaller, the fluoroether compound can be more uniformly applied, whereby the outer appearance becomes excellent. The evaluation standards are as follows.

⊚ (excellent): The haze is at most 0.1%.

○ (good): The haze is more than 0.1% and at most 0.2%.

Δ (acceptable): The haze is more than 0.2% and at most 0.3%.

x (poor): The haze is more than 0.3%.

<Fingerprint Stain Removability>

An artificial fingerprint liquid (liquid consisting of oleic acid and squalene) was deposited on the flat surface of a silicon rubber plug, and extra oil was wiped off by a nonwoven fabric (manufactured by Asahi Kasei Corporation, BEMCOT (registered trademark) M-3), to prepare a stamp for fingerprint. Such a fingerprint stamp was placed on the surface layer and pressed with a load of 9.8N for 10 seconds. The haze at a portion where the fingerprint adhered, was measured by a haze meter, and taken as an initial value. With respect to the portion where the fingerprint adhered, wiping was conducted using a reciprocating traverse testing machine (manufactured by KNT Co.) having a tissue paper attached, with a load of 4.9N. The value of haze was measured every one reciprocation wiping, and the number of wiping times where the haze became at most 10% of the initial value, was measured. The smaller the number of wiping times is, the easier the removal of the fingerprint becomes, whereby the fingerprint stain removability becomes excellent. The evaluation standards are as follows.

⊚ (excellent): The number of wiping times is at most 3 times.

○ (good): The number of wiping times is from 4 to 5 times.

Δ (acceptable): The number of wiping times is from 6 to 8 times.

x (poor): The number of wiping times is at least 9 times.

<Light Resistance>

The surface layer was irradiated with light (650 W/m$^2$, 300 to 700 nm) using a tabletop xenon arc lamp type accelerated light resistance testing machine (manufactured by Toyo Seiki Seisaku-sho, Ltd., SUNTEST XLS+), at a black panel temperature of 63° C., for 672 hours, whereupon the water contact angle was measured. The smaller the decrease in the water contact angle after the accelerated light resistance test is, the smaller the decrease in performance due to light becomes, whereby the light resistance is excellent. The evaluation standards are as follows.

⊚ (excellent): The change in water contact angle after the accelerated light resistance test is at most 10°.

○ (good): The change in water contact angle after the accelerated light resistance test is more than 10° and at most 15°.

Δ (acceptable): The change in water contact angle after the accelerated light resistance test is more than 15° and at most 20°.

x (poor): The change in water contact angle after the accelerated light resistance test is more than 20°.

<Lubricity>

The dynamic friction coefficient of the surface layer to an artificial skin (manufactured by Idemitsu Technofine Co., PBZ13001) was measured using a load variation type friction wear test system (manufactured by Shinto Scientific Co., Ltd. HHS2000) under conditions of a contact area: 3 cm×3 cm, and a load: 0.98N. The smaller the dynamic friction coefficient, the better the lubricity. The evaluation standards are as follows.

⊚ (excellent): The dynamic friction coefficient is at most 0.3.

○ (good): The dynamic friction coefficient is more than 0.3 and at most 0.4.

Δ (acceptable): The dynamic friction coefficient is more than 0.4 and at most 0.5.

x (poor): The dynamic friction coefficient is more than 0.5.

TABLE 1

| | | | Ex. | | | | | | | |
|---|---|---|---|---|---|---|---|---|---|---|
| | | | 1 | 2 | 3 | 4 | 5 | 6 | 7 | 8 |
| Compound (1) | Compound (1-3-1) | mass % | 0 | 20 | 40 | 50 | 60 | 70 | 80 | 100 |
| Compound (2) | Compound (2-1-1) | mass % | 100 | 80 | 60 | 50 | 40 | 30 | 20 | 0 |
| Compound (1) | Compound (1-3-1) | mol % | 0 | 21 | 42 | 52 | 62 | 71 | 81 | 100 |
| Compound (2) | Compound (2-1-1) | mol % | 100 | 79 | 58 | 48 | 38 | 29 | 19 | 0 |
| Dry coating | Initial contact angle | Water | ⊚ | ⊚ | ⊚ | ○ | ○ | ○ | ○ | ○ |
| | | n-hexadecane | ⊚ | ⊚ | ⊚ | ⊚ | ⊚ | ○ | ○ | ○ |
| | Abrasion resistance | | ⊚ | ⊚ | ○ | ○ | ○ | ○ | Δ | X |
| | Outer appearance | | ⊚ | ⊚ | ⊚ | ⊚ | ⊚ | ⊚ | ⊚ | ⊚ |
| | Fingerprint stain removability | | ○ | ○ | ⊚ | ⊚ | ⊚ | ⊚ | ○ | ○ |
| | Light resistance | | X | Δ | ○ | ○ | ⊚ | ⊚ | ○ | Δ |
| | Lubricity | | ○ | ○ | ○ | ○ | ○ | ○ | ○ | ○ |

In Ex. 2 to 7 where the content of the compound (1) is from 10 to 90 mol % to the total content of the compound (1) and the compound (2), the abrasion resistance and the light resistance were excellent.

In Ex. 1 where only the compound (2) was used, the light resistance was poor.

In Ex. 8 where only the compound (1) was used, the abrasion resistance was poor.

Ex. 11 to 20

The compound (1) and the compound (2) were mixed in a proportion shown in Table 2, to obtain the composition in each of Ex. 11 to 21. An article was obtained in the same manner as in Ex. 1 to 8, and the article was evaluated. The results are shown in Table 2.

TABLE 2

|  |  |  | Ex. 11 | 12 | 13 | 14 | 15 | 16 | 17 | 18 | 19 | 20 |
|---|---|---|---|---|---|---|---|---|---|---|---|---|
| Compound (1) | Compound (1-3-1) | mass % | 41 | 61 | 0 | 44 | 64 | 0 | 0 | 0 | 0 | 0 |
|  | Compound (1-1-1) | mass % | 0 | 0 | 0 | 0 | 0 | 37 | 57 | 41 | 61 | 100 |
| Compound (2) | Compound (2-1-2) | mass % | 59 | 39 | 0 | 0 | 0 | 63 | 43 | 0 | 0 | 0 |
|  | Compound (2-2-1) | mass % | 0 | 0 | 100 | 56 | 36 | 0 | 0 | 59 | 39 | 0 |
| Compound (1) | Compound (1-3-1) | mol % | 42 | 62 | 0 | 42 | 62 | 0 | 0 | 0 | 0 | 0 |
|  | Compound (1-1-1) | mol % | 0 | 0 | 0 | 0 | 0 | 42 | 62 | 42 | 62 | 100 |
| Compound (2) | Compound (2-1-2) | mol % | 58 | 38 | 0 | 0 | 0 | 58 | 38 | 0 | 0 | 0 |
|  | Compound (2-2-1) | mol % | 0 | 0 | 100 | 58 | 38 | 0 | 0 | 58 | 38 | 0 |
| Dry coating | Initial contact angle | Water | ○ | ○ | ◎ | ◎ | ◎ | ○ | ○ | ○ | ○ | ○ |
|  |  | n-hexadecane | ◎ | ◎ | ◎ | ◎ | ◎ | ◎ | ○ | ◎ | ○ | ○ |
|  | Abrasion resistance |  | ◎ | ○ | Δ | ○ | ◎ | ○ | ○ | ○ | ○ | X |
|  | Outer appearance |  | ◎ | ◎ | ◎ | ◎ | ◎ | ◎ | ◎ | ◎ | ◎ | ◎ |
|  | Fingerprint stain removability |  | ◎ | ◎ | ○ | ◎ | ◎ | ○ | ○ | ◎ | ○ | ○ |
|  | Light resistance |  | ○ | ○ | X | ○ | ○ | ○ | ○ | ○ | ○ | X |
|  | Lubricity |  | ○ | ○ | ○ | ○ | ○ | ○ | ○ | ○ | ○ | ○ |

In Ex. 11 to 12 and 14 to 19 where the content of the compound (1) was from 10 to 90 mol %, to the total of the compound (1) and the compound (2), the abrasion resistance and the light resistance were excellent.

In Ex. 13 where only the compound (2) was used, the light resistance was poor.

In Ex. 20 where only the compound (1) was used, the abrasion resistance and the light resistance was poor.

INDUSTRIAL APPLICABILITY

The fluoroether compound of the present invention can be suitably used for surface treatment for imparting water/oil repellency to the surface of a substrate of e.g. an optical article, a touch panel (such as a surface to be touched with a finger), an antireflection film or an antireflection glass. Further, it can be used as a releasing agent for a mold.

This application is a continuation of PCT Application No. PCT/JP2017/009811, filed on Mar. 10, 2017, which is based upon and claims the benefit of priority from Japanese Patent Application No. 2016-213224 filed on Oct. 31, 2016. The contents of those applications are incorporated herein by reference in their entireties.

What is claimed is:

1. A fluoroether composition, comprising:
a first compound and
a second compound,
wherein
a content of the first compound in the fluoroether composition, is from 20 to 85 mol %, to a total content of the first compound and the second compound, wherein the first compound is a compound of formula (1):

$$[A^1\text{-}O\text{-}Q^1\text{-}R^{f1}\text{—}]_{a1}Z^1\text{—}SiR^1_{n1}L^1_{3-n1} \quad (1)$$

wherein
$A^1$ is a perfluoroalkyl group,
$Q^1$ is a single bond, an oxyfluoroalkylene group comprising one or more hydrogen atoms, wherein an oxygen atom is bonded to $R^{f1}$, or a poly(oxyfluoroalkylene) chain comprising one or more hydrogen atoms, wherein a terminal oxygen atom is bonded to $R^{f1}$ and the oxyfluoroalkylene group bonded to $R^{f1}$ comprises one or more hydrogen atoms,
$R^{f1}$ is a poly(oxyperfluoroalkylene) chain, wherein a terminal oxygen atom is bonded to $Z^1$,
a1 is an integer of at least 1,
wherein, when a1 is at least 2, a1 pieces of $[A^1\text{-}O\text{-}Q^1\text{-}R^{f1}\text{-}]$ is optionally the same or different from one another,
$Z^1$ is a (a1+1) valent connecting group,
$R^1$ is a hydrogen atom or a monovalent hydrocarbon group,
$L^1$ is a hydroxy group or a hydrolyzable group,
n1 is 0 or 1, and
(3−n1) pieces of $L^1$ is optionally the same or different; and the second compound is a compound of formula (2):

$$[A^2\text{-}O\text{-}Q^2\text{-}R^{f2}\text{—}]_{a2}Z^2[\text{—}SiR^2_{n2}L^2_{3-n2}]_{b2} \quad (2)$$

wherein
$A^2$ is a perfluoroalkyl group,
$Q^2$ is a single bond, an oxyfluoroalkylene group comprising one or more hydrogen atoms, wherein an oxygen atom is bonded to $R^{f2}$, or a poly(oxyfluoroalkylene) chain comprising one or more hydrogen atoms, wherein a terminal oxygen atom is bonded to $R^{f2}$ and the oxyfluoroalkylene group bonded to $R^{f2}$ comprises one or more hydrogen atoms,
$R^{f2}$ is a poly(oxyperfluoroalkylene) chain, wherein a terminal oxygen atom is bonded to $Z^2$,
a2 is an integer of at least 1,
wherein, when a2 is at least 2, a2 pieces of $[A^2\text{-}O\text{-}Q^2\text{-}R^{f2}\text{-}]$ is optionally the same or different from one another,
$Z^2$ is a (a2+b2) valent connecting group,
$R^2$ is a hydrogen atom or a monovalent hydrocarbon group, $L^2$ is a hydroxy group or a hydrolyzable group,
n2 is an integer of from 0 to 2,
wherein, when n2 is 0 or 1, (3−n2) pieces of $L^2$ is optionally the same or different,
when n2 is 2, n2 pieces of $R^2$ is optionally the same or different,
b2 is an integer of at least 2, and
b2 pieces of $[-SiR^2{}_{n2}L^2{}_{3-n2}]$ is optionally the same or different from one another.

2. The fluoroether composition according to claim 1, wherein b2 is an integer of from 2 to 4.

3. The fluoroether composition according to claim 1, wherein the first compound is a compound of formula (1-1):

$$A^1\text{-O-}Q^1\text{-}R^{f1}\text{-}Q^{11}CX_2O(CH_2)_3\text{—}SiR^1{}_{n1}L^1{}_{3-n1} \quad (1\text{-}1)$$

a compound of formula (1-2):

$$A^1\text{-O-}Q^1\text{-}R^{f1}\text{-}Q^{11}CX_2OCH_2CH(CH_3)\text{—}SiR^1{}_{n1}L^1{}_{3-n1} \quad (1\text{-}2)$$

a compound of formula (1-3):

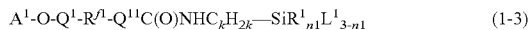
$$A^1\text{-O-}Q^1\text{-}R^{f1}\text{-}Q^{11}C(O)NHC_kH_{2k}\text{—}SiR^1{}_{n1}L^1{}_{3-n1} \quad (1\text{-}3)$$

a compound of formula (1-4):

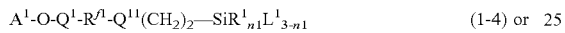
$$A^1\text{-O-}Q^1\text{-}R^{f1}\text{-}Q^{11}(CH_2)_2\text{—}SiR^1{}_{n1}L^1{}_{3-n1} \quad (1\text{-}4)$$

or a compound of formula (1-5):

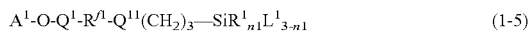
$$A^1\text{-O-}Q^1\text{-}R^{f1}\text{-}Q^{11}(CH_2)_3\text{—}SiR^1{}_{n1}L^1{}_{3-n1} \quad (1\text{-}5)$$

wherein
$Q^{11}$ is a perfluoroalkylene group,
$CX_2$ is CFH or $CH_2$, and
k is an integer of at least 1.

4. The fluoroether composition according to claim 1, wherein the second compound is a compound of formula (2-1):

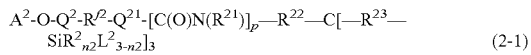
$$A^2\text{-O-}Q^2\text{-}R^{f2}\text{-}Q^{21}\text{-}[C(O)N(R^{21})]_p\text{—}R^{22}\text{—}C[\text{—}R^{23}\text{—}SiR^2{}_{n2}L^2{}_{3-n2}]_3 \quad (2\text{-}1)$$

wherein,
$Q^{21}$ is a perfluoroalkylene group, a fluoroalkylene group comprising one or more hydrogen atoms, or a fluoroalkylene group with at least two carbon atoms, comprising one or more hydrogen atoms and having an etheric oxygen atom between carbon atoms,
$R^{21}$ is a hydrogen atom or an alkyl group,
$R^{22}$ is a single bond, an alkylene group, an alkylene group having an etheric oxygen atom at a terminal, which is a terminal on a side bonded to C on an immediate right, an alkylene group with at least two carbon atoms, having an etheric oxygen atom between carbon atoms, or an alkylene group with at least two carbon atoms, having an etheric oxygen atom at a terminal, which is a terminal on a side bonded to C on an immediate right and between carbon atoms, and
$R^{23}$ is an alkylene group, an alkylene group having an etheric oxygen atom at a terminal, which is a terminal on a side bonded to C on an immediate left, an alkylene group with at least two carbon atoms, having an etheric oxygen atom between carbon atoms, or an alkylene group with at least two carbon atoms, having an etheric oxygen atom at a terminal which is a terminal on a side bonded to C on an immediate left and between carbon atoms, or
the second compound is a compound of formula (2-2):

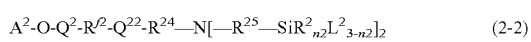
$$A^2\text{-O-}Q^2\text{-}R^{f2}\text{-}Q^{22}\text{-}R^{24}\text{—}N[\text{—}R^{25}\text{—}SiR^2{}_{n2}L^2{}_{3-n2}]_2 \quad (2\text{-}2)$$

wherein
$Q^{22}$ is a perfluoroalkylene group,
$R^{24}$ is a single bond, an alkylene group, an alkylene group having an etheric oxygen atom or —NH— at a terminal, wherein a terminal on a side bonded to N is excluded, an alkylene group with at least two carbon atoms, having an etheric oxygen atom or —NH— between carbon atoms, or an alkylene group with at least two carbon atoms, having an etheric oxygen atom or —NH— at a terminal, wherein a terminal on a side bonded to N is excluded, and between carbon atoms, and
$R^{25}$ is an alkylene group, or an alkylene group with at least two carbon atoms, having an etheric oxygen atom or —NH— between carbon atoms.

5. The fluoroether composition according to claim 1, wherein the first compound has a number average molecular weight of from 500 to 20,000, and the second compound has a number average molecular weight of from 500 to 20,000.

6. The fluoroether composition according to claim 1, wherein an absolute value of a difference between a number average molecular weight of the first compound and a number average molecular weight of the second compound is at most 2,000.

7. The fluoroether composition according to claim 1, wherein
$R^{f1}$ is $(R^{F1}O)_{m1}$, wherein $R^{F1}$ is a $C_{1-6}$ perfluoroalkylene group, m1 is an integer of from 2 to 200, and which is optionally composed of at least two types of $R^{F1}O$ having different number of carbon atoms and
$R^{f2}$ is $(R^{F2}O)_{m2}$, wherein $R^{F2}$ is a $C_{1-6}$ perfluoroalkylene group, m2 is an integer of from 2 to 200, and which is optionally composed of at least two types of $R^{F2}O$ having different number of carbon atoms.

8. The fluoroether composition according to claim 1, wherein
$R^{f1}$ is $\{(CF_2O)_{m11}(CF_2CF_2O)_{m12}(CF_2CF_2CF_2O)_{m13}(CF_2CF_2CF_2CF_2O)_{m14}\}$, wherein each of m11 and m12 is an integer of at least 1, each of m13 and m14 is an integer of 0 or at least 1, and m11+m12+m13+m14 is an integer of from 2 to 200, or $(CF_2CF_2O\text{—}CF_2CF_2CF_2CF_2O)_{m15}(CF_2CF_2O)$, wherein m15 is an integer of from 1 to 99, and
$R^{f2}$ is $\{(CF_2O)_{m21}(CF_2CF_2O)_{m22}(CF_2CF_2CF_2O)_{m23}(CF_2CF_2CF_2CF_2O)_{m24}\}$, wherein each of m21 and m22 is an integer of at least 1, each of m23 and m24 is an integer of 0 or at least 1, and m21+m22+m23+m24 is an integer of from 2 to 200, or $(CF_2CF_2O\text{—}CF_2CF_2CF_2CF_2O)_{m25}(CF_2CF_2O)$, wherein m25 is an integer of from 1 to 99.

9. A coating fluid, comprising:
the fluoroether composition of claim 1; and
a liquid medium.

10. An article having a surface layer which is formed of the fluoroether composition of claim 1.

11. A method for producing an article, the method comprising:
treating a surface of a substrate by dry coating with the fluoroether composition of claim 1, to produce an article having a surface layer which is formed of the fluoroether composition.

12. A method for producing an article, the method comprising:
treating a surface of a substrate by wet coating with the coating fluid of claim 9, to produce an article having a surface layer which is formed of a fluoroether compound.

13. The fluoroether composition according to claim 1, wherein a content of the first compound in the fluoroether composition, is from 20 to 80 mass %, to a total content of the first compound and the second compound.

14. The fluoroether composition according to claim 1, wherein a content of the first compound in the fluoroether composition, is from 40 to 75 mol %, to a total content of the first compound and the second compound.

15. The fluoroether composition according to claim 1, wherein the fluoroether composition optionally comprises a third compound which is a fluoroether compound other than the first compound or the second compound, and a total content of the first compound, the second compound, and the third compound in the fuoroether composition is from 80 to 100 mass %.

16. The fluoroether composition according to claim 15, wherein the total content of the first compound, the second compound, and the third compound in the fuoroether composition is from 85 to 100 mass %.

17. The fluoroether composition according to claim 15, wherein a content of the third compound is from 0 to 20 mass %, to the total of the first compound, the second compound, and the third compound.

18. A vacuum deposition source comprising the fluoroether composition of claim 1.

19. An article comprising: a chemically strengthened glass; and a surface layer formed on the chemically strengthened glass, the surface layer being formed of the fluoroether composition of claim 1.

20. The article according to claim 19, wherein a thickness of the surface layer is from 1 to 100 nm.

* * * * *